US012706655B2

(12) United States Patent
Chen et al.

(10) Patent No.: US 12,706,655 B2
(45) Date of Patent: Aug. 11, 2026

(54) PRECODING METHOD AND COMMUNICATION APPARATUS

(71) Applicant: Huawei Technologies Co., Ltd., Shenzhen (CN)

(72) Inventors: Ying Chen, Hangzhou (CN); Jianwei Zhou, Hangzhou (CN); Jiayu Zheng, Hangzhou (CN); Hejia Luo, Hangzhou (CN); Rong Li, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 454 days.

(21) Appl. No.: 18/174,504

(22) Filed: Feb. 24, 2023

(65) Prior Publication Data

US 2023/0275639 A1 Aug. 31, 2023

Related U.S. Application Data

(63) Continuation of application No. PCT/CN2021/110405, filed on Aug. 3, 2021.

(30) Foreign Application Priority Data

Aug. 27, 2020 (CN) ......................... 202010880350.7

(51) Int. Cl.

| | |
|---|---|
| ***H04B 7/06*** | (2006.01) |
| ***H04B 7/0456*** | (2017.01) |
| ***H04B 7/185*** | (2006.01) |

(52) U.S. Cl.

CPC ......... *H04B 7/0639* (2013.01); *H04B 7/0456* (2013.01)

(58) Field of Classification Search

None

See application file for complete search history.

(56) References Cited

U.S. PATENT DOCUMENTS

| | | | | |
|---|---|---|---|---|
| 9,774,375 | B2 * | 9/2017 | Gao | H04B 7/0639 |
| 10,505,694 | B2 * | 12/2019 | Liu | H04W 72/542 |
| 10,511,367 | B2 * | 12/2019 | Zhang | H04B 7/0626 |
| 10,756,801 | B2 * | 8/2020 | Zhang | H04L 25/03898 |
| 10,819,485 | B2 * | 10/2020 | Zhang | H04B 7/0663 |
| 10,873,378 | B2 * | 12/2020 | Tang | H04W 72/046 |
| 11,996,917 | B2 * | 5/2024 | Zhu | H04B 7/0456 |
| 2011/0069773 | A1 * | 3/2011 | Doron | H04B 7/0417 375/267 |

(Continued)

FOREIGN PATENT DOCUMENTS

| | | |
|---|---|---|
| CN | 105391513 A | 3/2016 |
| CN | 106301490 A | 1/2017 |
| CN | 107181509 A | 9/2017 |

*Primary Examiner* — Jenee Holland

(74) *Attorney, Agent, or Firm* — Slater Matsil, LLP

(57) ABSTRACT

This application relates to the field of communication technologies, and provides a precoding method and a communication apparatus. The method includes: A terminal device obtains a first reference signal, where the first reference signal is a reference signal precoded by using a first precoding matrix. Then the terminal device sends first information, where the first information is determined based on a measurement result of the first reference signal, and is used to determine a target precoding matrix. Then the terminal device obtains information precoded by using the target precoding matrix.

20 Claims, 10 Drawing Sheets

(56) References Cited

U.S. PATENT DOCUMENTS

2013/0044799 A1* 2/2013 Lan .................... H04B 7/0478
375/224
2013/0070723 A1* 3/2013 Yie .................... H04B 7/0641
370/329
2013/0301751 A1* 11/2013 Badic .................. H04B 7/0413
375/295
2017/0047975 A1* 2/2017 Lee .................... H04B 7/0478
2018/0062715 A1* 3/2018 Li .......................... H04B 7/04
2018/0091198 A1* 3/2018 Zhang ................ H04B 7/0456
2019/0068266 A1 2/2019 Chang et al.
2019/0199413 A1* 6/2019 Sundararajan ....... H04B 7/0617
2019/0229786 A1* 7/2019 Huang ................ H04B 7/0478
2020/0036417 A1* 1/2020 Tamrakar ............ H04B 7/0639
2020/0106491 A1* 4/2020 Wu .......................... H04L 1/16
2020/0274585 A1* 8/2020 Huang ............. H04L 25/03898
2021/0013936 A1* 1/2021 Zhu .................... H04B 7/0628
2021/0028843 A1* 1/2021 Zhou .................... H04B 7/063
2021/0099214 A1* 4/2021 Ren ...................... H04W 72/23
2021/0320771 A1* 10/2021 Liu ...................... H04L 5/0048
2022/0131579 A1* 4/2022 Xu ...................... H04B 7/0456
2023/0040058 A1* 2/2023 Huang ................ H04B 7/0456
2023/0062132 A1* 3/2023 Wu ...................... H04B 7/024
2023/0275639 A1* 8/2023 Chen .................. H04B 7/0639
370/329
2023/0361842 A1* 11/2023 Hajri .................. H04B 7/0639
2024/0333359 A1* 10/2024 Liu ...................... H04W 72/51

* cited by examiner

PRECODING METHOD AND COMMUNICATION APPARATUS

CROSS-REFERENCE TO RELATED APPLICATIONS

This application is a continuation of International Application No. PCT/CN2021/110405, filed on Aug. 3, 2021, which claims priority to Chinese Patent Application No. 202010880350.7, filed on Aug. 27, 2020. The disclosures of the aforementioned applications are hereby incorporated by reference in their entireties.

TECHNICAL FIELD

This application relates to the field of communication technologies, and in particular, to a precoding method and a communication apparatus.

BACKGROUND

Currently, a precoding technology is used in a satellite communication system to improve anti-interference performance of the system. A terminal device sends channel information to an access network device deployed on a satellite. Correspondingly, the access network device receives the channel information from the terminal device. Then the access network device restores a precoding matrix based on the channel information, preprocesses a to-be-transmitted signal by using the precoding matrix, and sends a preprocessed signal to the terminal device, to reduce interference between signals.

However, in the foregoing precoding process, the precoding matrix is determined based on the channel information fed back by the terminal device. The feedback of the channel information needs to occupy a large quantity of transmission resources, causing "high overheads of transmission resources."

SUMMARY

Embodiments of this application provide a precoding method and a communication apparatus, to save transmission resources for feeding back channel information.

To achieve the foregoing objective, the following technical solutions are used in embodiments of this application.

According to a first aspect, an embodiment of this application provides a precoding method. The method may be performed by a terminal device or a chip used in a terminal device. The following provides descriptions by using an example in which the method is performed by a terminal device. The method includes: A terminal device receives a first reference signal from an access network device, where the first reference signal is a reference signal precoded by using a first precoding matrix. Then the terminal device sends first information to the access network device, where the first information is determined based on a measurement result of the first reference signal, the first information includes information about a target channel between the terminal device and the access network device, the target channel is used to transmit the first reference signal, and the first information is used by the access network device to determine a target precoding matrix. Then the terminal device receives, from the access network device, information precoded by using the target precoding matrix.

According to the precoding method provided in this embodiment of this application, when the terminal device receives the first reference signal, because the first reference signal is a reference signal precoded by using the first precoding matrix and is transmitted through the target channel, the information about the target channel that is included in the first information is equivalent channel information. Compared with feeding back real channel information of the target channel, a first channel occupies fewer transmission resources, thereby saving transmission resources for feeding back channel information. In addition, for the access network device, the access network device determines the target precoding matrix based on the first precoding matrix and the first information, and the first precoding matrix is a predictable coding matrix. Therefore, when the terminal device feeds back the equivalent channel information of the target channel, overheads of transmission resources used to feed back channel information can be reduced, and information between the terminal device and the access network device is precoded by using the target precoding matrix.

In a possible design, a first precoding matrix at a $1^{st}$ moment is a basic precoding matrix determined based on the first channel, where the first channel is a channel between the access network device and a target reference point, and the terminal device is located in an area range corresponding to the target reference point; and a first precoding matrix at an $i^{th}$ moment is a target precoding matrix at an $(i-1)^{th}$ moment, where i is a positive integer, and $i \geq 2$. That is, the first precoding matrix is a predictable coding matrix.

In a possible design, the first information includes amplitude information of the target channel and/or phase information of the target channel. For example, the measurement result of the first reference signal includes an amplitude measurement result of the first reference signal and a phase measurement result of the first reference signal, the amplitude information in the first information is obtained by quantizing the amplitude measurement result of the first reference signal, and the phase information in the first information is obtained by quantizing the phase measurement result of the first reference signal.

In a possible design, a resolution corresponding to the first information is preconfigured. Alternatively, the precoding method in this embodiment of this application further includes: The terminal device determines a resolution corresponding to the first information, and then the terminal device sends, to the access network device, the resolution corresponding to the first information. Alternatively, the precoding method in this embodiment of this application further includes: The terminal device receives indication information from the access network device, where the indication information indicates a resolution corresponding to the first information.

That is, in the precoding method in this embodiment of this application, the resolution of the first information may be preconfigured, and the resolution corresponding to the first information does not need to be indicated between the access network device and the terminal device again, thereby reducing overheads of air interface resources. Alternatively, the resolution of the first information may be determined by the access network device and then provided for the terminal device, so that all terminal devices that provide the first information for the access network device can obtain resolution information, thereby meeting a requirement of the access network device. Alternatively, the resolution of the first information may be determined by the terminal device. Therefore, the terminal device can flexibly adjust the resolution of the first information according to a requirement of the terminal device, thereby improving flexibility of setting the resolution.

In a possible design, first information at a $1^{st}$ moment includes channel information of the target channel at the $1^{st}$ moment; or first information at an $N^{th}$ moment includes differential information of the target channel at an $(N-1)^{th}$ moment and the $N^{th}$ moment, where at an $i^{th}$ moment, the target channel is used to transmit a first reference signal corresponding to the $i^{th}$ moment, i and N are positive integers, $1 \leq i \leq N$, and $N \geq 2$.

Therefore, when the terminal device does not move, a channel change caused by movement of a satellite is compensated for by the first precoding matrix. The terminal device may not feed back the first information, or the terminal device feeds back the first information less frequently, thereby saving transmission resources for feeding back the first information.

In a possible design, the precoding method in this embodiment of this application further includes: The terminal device receives a second reference signal from the access network device, where the second reference signal is a reference signal precoded by using a third precoding matrix. Then the terminal device determines second information based on the measurement result of the first reference signal and a measurement result of the second reference signal, where the second information indicates the first reference signal. Then the terminal device sends the second information to the access network device, where the second information is used by the access network device to determine that the first precoding matrix is used for data transmission.

Therefore, when the access network device determines a group of reference points, the access network device can determine different precoding matrices (for example, the first precoding matrix and the third precoding matrix) based on different reference points corresponding to a beam, and then send, to the terminal device, reference signals precoded by using the different precoding matrices (that is, the first reference signal precoded by using the first precoding matrix and the third reference signal precoded by using the third precoding matrix). The terminal device can feed back the second information to the access network device, to indicate a reference signal to the access network device. Therefore, the access network device can learn of a reference point closer to the terminal device, or the access network device learns of a reference signal on which the terminal device has better detection performance. Therefore, the access network device may determine, based on the second information, a precoding matrix used for data transmission (for example, the first precoding matrix). Herein, because the first precoding matrix is determined based on the first channel between the access network device and the target reference point, the first precoding matrix better matches the target channel, thereby reducing overheads of resources used by the terminal device to feed back the first information for the first time.

According to a second aspect, an embodiment of this application provides a precoding method. The method may be performed by a terminal device or a chip used in a terminal device. The following provides descriptions by using an example in which the method is performed by a terminal device. The method includes: A terminal device obtains channel information of a first channel. Then the terminal device sends first information to an access network device, where the first information is determined based on the channel information of the first channel and channel information of a target channel, the target channel is a channel between the terminal device and the access network device, and the first information is used by the access network device to determine a target precoding matrix. The terminal device receives, from the access network device, information precoded by using the target precoding matrix.

According to the precoding method provided in this embodiment of this application, when the terminal device obtains the channel information of the first channel, the terminal device can determine the first information based on the channel information of the target channel and the channel information of the first channel, to feed back the first information to the access network device. Therefore, the first information includes information about a difference between the channel information of the target channel and the channel information of the first channel. Compared with feeding back real channel information of the target channel, the first channel occupies fewer transmission resources, thereby saving transmission resources for feeding back channel information. In addition, for the access network device, the access network device determines the target precoding matrix based on the first precoding matrix and the first information, and the first precoding matrix is a predictable coding matrix. Therefore, when the terminal device feeds back the first information, overheads of transmission resources used to feed back channel information can be reduced, and information between the terminal device and the access network device is precoded by using the target precoding matrix.

In a possible design, a first channel at a $1^{st}$ moment is a channel between the access network device and a target reference point; and a first channel at an $i^{th}$ moment is a channel between the access network device and the terminal device at an $(i-1)^{th}$ moment, where i is a positive integer, and $i \geq 2$. That is, the first channel is a predictable channel, and the channel information of the first channel is also predictable channel information.

In a possible design, that a terminal device obtains channel information of a first channel includes: The terminal device receives the channel information of the first channel from the access network device. Alternatively, the terminal device receives location information from the access network device, and then the terminal device determines the channel information of the first channel based on the location information, where the location information includes at least one of the following: information about relative locations of the access network device and the target reference point, or a geographical location of the target reference point.

Therefore, the access network device can provide the channel information of the first channel for the terminal device. Alternatively, when the access network device provides the location information for the terminal device, the terminal device may determine the channel information of the first channel based on the location information.

In a possible design, the first information includes amplitude information and/or phase information. The amplitude information includes differential information of amplitudes of the first channel and the target channel, and the phase information includes differential information of phases of the first channel and the target channel. The channel information includes an amplitude and a phase.

Therefore, when the terminal device does not move, the terminal device may not feed back the first information, or the terminal device feeds back the first information less frequently, thereby saving transmission resources for feeding back the first information.

In a possible design, a resolution corresponding to the first information is preconfigured. Alternatively, the precoding method in this embodiment of this application further includes: The terminal device determines a resolution corresponding to the first information, and then the terminal device sends, to the access network device, the resolution corresponding to the first information. Alternatively, the precoding method in this embodiment of this application further includes: The terminal device receives indication information from the access network device, where the indication information indicates a resolution corresponding to the first information.

That is, in the precoding method in this embodiment of this application, the resolution of the first information may be preconfigured, and the resolution corresponding to the first information does not need to be indicated between the access network device and the terminal device again, thereby reducing overheads of air interface resources. Alternatively, the resolution of the first information may be determined by the access network device and then provided for the terminal device, so that all terminal devices that provide the first information for the access network device can obtain resolution information, thereby meeting a requirement of the access network device. Alternatively, the resolution of the first information may be determined by the terminal device. Therefore, the terminal device can flexibly adjust the resolution of the first information according to a requirement of the terminal device, thereby improving flexibility of setting the resolution.

In a possible design, the precoding method in this embodiment of this application further includes: The terminal device receives a first reference signal and a second reference signal from the access network device, where reference points corresponding to the first reference signal and the second reference signal are different. Then the terminal device determines second information based on a measurement result of the first reference signal and a measurement result of the second reference signal, where the second information indicates the first reference signal, the second information is used by the access network device to determine that the first channel is a channel between the access network device and the target reference point, and the first reference signal corresponds to the target reference point.

Therefore, when the access network device determines a group of reference points, the access network device can send different reference signals (that is, the first reference signal and the second reference signal) to the terminal device. The terminal device can feed back the second information to the access network device, to indicate a reference signal to the access network device. Therefore, the access network device can learn of a reference point closer to the terminal device, or the access network device can learn of a reference signal on which the terminal device has the best detection performance. The access network device may determine, based on the second information, that the first channel is a channel between the access network device and the target reference point. Therefore, a difference between the first channel and the target channel is smaller, and the first information includes information about the difference between the first channel and the target channel, thereby reducing overheads of resources used to feed back the first information.

According to a third aspect, an embodiment of this application provides a precoding method. The method may be performed by an access network device or a chip used in an access network device. The following provides descriptions by using an example in which the method is performed by an access network device. The method includes: An access network device sends a first reference signal to a terminal device, where the first reference signal is a reference signal precoded by using a first precoding matrix. Then the access network device receives first information from the terminal device, where the first information is determined based on a measurement result of the first reference signal, the first information includes information about a target channel between the access network device and the terminal device, and the target channel is used to transmit the first reference signal. The access network device determines a second precoding matrix based on the first information. The access network device determines a target precoding matrix based on the first precoding matrix and the second precoding matrix. The access network device precodes to-be-sent information by using the target precoding matrix.

In a possible design, a first precoding matrix at a $1^{st}$ moment is a basic precoding matrix determined based on a first channel, where the first channel is a channel between the access network device and a target reference point, and the terminal device is located in an area range corresponding to the target reference point; and a first precoding matrix at an $i^{th}$ moment is a target precoding matrix at an $(i-1)^{th}$ moment, where i is a positive integer, and $i \geq 2$.

In a possible design, the precoding method in this embodiment of this application further includes: The access network device obtains location information, where the location information includes at least one of the following: information about relative locations of the access network device and the target reference point, or a geographical location of the target reference point, and the terminal device is located in the area range corresponding to the target reference point. Then the access network device determines channel information of the first channel based on the location information, where the first channel is a channel between the access network device and the target reference point. The access network device determines the first precoding matrix based on the channel information of the first channel.

In a possible design, the first information includes amplitude information of the target channel and/or phase information of the target channel.

In a possible design, a resolution corresponding to the first information is preconfigured. Alternatively, the precoding method in this embodiment of this application further includes: The access network device receives, from the terminal device, a resolution corresponding to the first information. Alternatively, the precoding method in this embodiment of this application further includes: The access network device determines a resolution corresponding to the first information, and then the access network device sends indication information to the terminal device, where the indication information indicates the resolution corresponding to the first information.

In a possible design, that the access network device determines a second precoding matrix based on the first information includes: The access network device determines a second precoding matrix at an $N^{th}$ moment based on first information at the $N^{th}$ moment, where the first information at the $N^{th}$ moment includes differential information of the target channel at the $N^{th}$ moment and an $(N-1)^{th}$ moment, at an $i^{th}$ moment, the target channel is used to transmit a first reference signal corresponding to the $i^{th}$ moment, i and N are positive integers, $1 \leq i \leq N$, and $N \geq 2$. That the access network device determines a target precoding matrix based on the first precoding matrix and the second precoding matrix includes: The access network device determines a target precoding matrix at the $N^{th}$ moment based on a first precoding matrix at the $N^{th}$ moment and the second precoding matrix at the $N^{th}$ moment. That the access network device precodes to-be-sent information by using the target precoding matrix includes: The access network device precodes the to-be-sent information by using the target precoding matrix at the $N^{th}$ moment.

In a possible design, the precoding method in this embodiment of this application further includes: The access network device sends a second reference signal to the terminal device, where the second reference signal is a reference signal precoded by using a third precoding matrix. The access network device receives second information from the terminal device, where the second information is determined based on the measurement result of the first reference signal and a measurement result of the second reference signal, and indicates the first reference signal. The access network device determines, based on the second information, that the first precoding matrix corresponding to the first reference signal is used for data transmission.

According to a fourth aspect, an embodiment of this application provides a precoding method. The method may be performed by an access network device or a chip used in an access network device. The following provides descriptions by using an example in which the method is performed by an access network device. The method includes: An access network device obtains channel information of a first channel. The access network device receives first information from a terminal device, where the first information includes information about a difference between the channel information of the first channel and channel information of a target channel, and the target channel is a channel between the access network device and the terminal device. The access network device determines a target precoding matrix based on the channel information of the first channel and the first information. Then the access network device precodes to-be-sent information by using the target precoding matrix.

In a possible design, a first channel at a $1^{st}$ moment is a channel between the access network device and a target reference point; and a first channel at an $i^{th}$ moment is a channel between the access network device and the terminal device at an $(i-1)^{th}$ moment, where i is a positive integer, and $i \geq 2$.

In a possible design, the precoding method in this embodiment of this application further includes: The access network device obtains location information, where the location information includes at least one of the following: information about relative locations of the access network device and the target reference point, or a geographical location of the target reference point. The access network device determines the channel information of the first channel based on the location information.

In a possible design, the first information includes amplitude information and/or phase information. The amplitude information includes differential information of amplitudes of the first channel and the target channel, and the phase information includes differential information of phases of the first channel and the target channel. The channel information includes an amplitude and a phase.

In a possible design, a resolution corresponding to the first information is preconfigured. Alternatively, the precoding method in this embodiment of this application further includes: The access network device receives, from the terminal device, a resolution corresponding to the first information. Alternatively, the precoding method in this embodiment of this application further includes: The access network device determines a resolution corresponding to the first information, and then the access network device sends indication information to the terminal device, where the indication information indicates the resolution corresponding to the first information.

In a possible design, the precoding method in this embodiment of this application further includes: The access network device sends a first reference signal and a second reference signal to the terminal device, where reference points corresponding to the first reference signal and the second reference signal are different. The access network device receives second information from the terminal device, where the second information is determined based on a measurement result of the first reference signal and a measurement result of the second reference signal, and indicates the first reference signal. The access network device determines, based on the second information, that the first channel corresponding to the first reference signal is a channel between the access network device and the target reference point, where the first reference signal corresponds to the target reference point.

According to a fifth aspect, an embodiment of this application provides a communication apparatus. The communication apparatus includes units configured to perform the steps in any one of the foregoing aspects. The communication apparatus may be the terminal device in any one of the first aspect or the possible designs of the first aspect, or a chip that implements a function of the terminal device; or the communication apparatus may be the terminal device in any one of the second aspect or the possible designs of the second aspect, or a chip that implements a function of the terminal device. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a sixth aspect, an embodiment of this application provides a communication apparatus, including a processor and a memory. The memory is configured to store computer instructions. When the processor executes the instructions, the communication apparatus is enabled to perform the method in any one of the foregoing aspects. The communication apparatus may be the terminal device in any one of the first aspect or the possible designs of the first aspect, or a chip that implements a function of the terminal device; or the communication apparatus may be the terminal device in any one of the second aspect or the possible designs of the second aspect, or a chip that implements a function of the terminal device.

According to a seventh aspect, an embodiment of this application provides a communication apparatus, including a processor. The processor is configured to: after being coupled to a memory and reading instructions in the memory, perform the method in any one of the foregoing aspects according to the instructions. The communication apparatus may be the terminal device in any one of the first aspect or the possible designs of the first aspect, or a chip that implements a function of the terminal device; or the communication apparatus may be the terminal device in any one of the second aspect or the possible designs of the second aspect, or a chip that implements a function of the terminal device.

According to an eighth aspect, an embodiment of this application provides a chip, including a logic circuit and an input/output interface. The input/output interface is configured to communicate with a module outside the chip. For example, the input/output interface receives a first reference signal, channel information of a first channel, or information precoded by using a target precoding matrix, or the input/output interface sends first information. The logic circuit is configured to run a computer program or instructions, to implement the precoding method provided in any one of the foregoing aspects. The chip may be a chip that implements a function of the terminal device in any one of the first aspect or the possible designs of the first aspect, or the chip may be a chip that implements a function of the terminal device in any one of the second aspect or the possible designs of the second aspect.

According to a ninth aspect, an embodiment of this application provides a communication apparatus. The communication apparatus includes units configured to perform the steps in any one of the foregoing aspects. The communication apparatus may be the access network device in any one of the third aspect or the possible designs of the third aspect, or a chip that implements a function of the access network device; or the communication apparatus may be the access network device in any one of the fourth aspect or the possible designs of the fourth aspect, or a chip that implements a function of the access network device. The communication apparatus includes a corresponding module, unit, or means for implementing the foregoing method. The module, unit, or means may be implemented by hardware, software, or hardware executing corresponding software. The hardware or the software includes one or more modules or units corresponding to the foregoing functions.

According to a tenth aspect, an embodiment of this application provides a communication apparatus, including a processor and a memory. The memory is configured to store computer instructions. When the processor executes the instructions, the communication apparatus is enabled to perform the method in any one of the foregoing aspects. The communication apparatus may be the access network device in any one of the third aspect or the possible designs of the third aspect, or a chip that implements a function of the access network device; or the communication apparatus may be the access network device in any one of the fourth aspect or the possible designs of the fourth aspect, or a chip that implements a function of the access network device.

According to an eleventh aspect, an embodiment of this application provides a communication apparatus, including a processor. The processor is configured to: after being coupled to a memory and reading instructions in the memory, perform the method in any one of the foregoing aspects according to the instructions. The communication apparatus may be the access network device in any one of the third aspect or the possible designs of the third aspect, or a chip that implements a function of the access network device; or the communication apparatus may be the access network device in any one of the fourth aspect or the possible designs of the fourth aspect, or a chip that implements a function of the access network device.

According to a twelfth aspect, an embodiment of this application provides a chip, including a logic circuit and an input/output interface. The input/output interface is configured to communicate with a module outside the chip. For example, the input/output interface sends a first reference signal or information precoded by using a target precoding matrix, or the input/output interface receives first information. The logic circuit is configured to run a computer program or instructions, to implement the precoding method provided in any one of the foregoing aspects. The chip may be a chip that implements a function of the access network device in any one of the third aspect or the possible designs of the third aspect, or the chip may be a chip that implements a function of the access network device in any one of the fourth aspect or the possible designs of the fourth aspect.

According to a thirteenth aspect, an embodiment of this application provides a computer-readable storage medium. The computer-readable storage medium stores instructions. When the instructions are run on a computer, the computer is enabled to perform the precoding method in any one of the foregoing aspects.

According to a fourteenth aspect, an embodiment of this application provides a computer program product including instructions. When the computer program product is run on a computer, the computer is enabled to perform the precoding method in any one of the foregoing aspects.

According to a fifteenth aspect, an embodiment of this application provides a circuit system. The circuit system includes a processing circuit. The processing circuit is configured to perform the precoding method in any one of the foregoing aspects.

According to a sixteenth aspect, an embodiment of this application provides a communication system. The communication system includes the terminal device and the access network device in any one of the foregoing aspects.

For technical effects brought by any design of the fifth aspect to the sixteenth aspect, refer to beneficial effects in the corresponding method provided above. Details are not described herein again.

BRIEF DESCRIPTION OF THE DRAWINGS

FIG. 5(*b*) is a schematic flowchart of still another precoding method according to an embodiment of this application;

FIG. 5(*c*) is a schematic flowchart of still another precoding method according to an embodiment of this application;

FIG. 5(*d*) is a schematic flowchart of still another precoding method according to an embodiment of this application;

FIG. 7(*b*) is another schematic diagram of beam locations according to an embodiment of this application;

FIG. 7(*c*) is a schematic flowchart of still another precoding method according to an embodiment of this application;

DETAILED DESCRIPTION OF ILLUSTRATIVE EMBODIMENTS

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes other inherent steps or units of the process, the method, the product, or the device. In embodiments of this application, "a plurality of" includes two or more, and the "system" and the "network" may be replaced with each other. In embodiments of this application, the word "example", "for example", or the like is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

Technical terms used in this application are described first.

Precoding is an efficient interference suppression technology and is widely used in the field of terrestrial communication.

Figure 1:
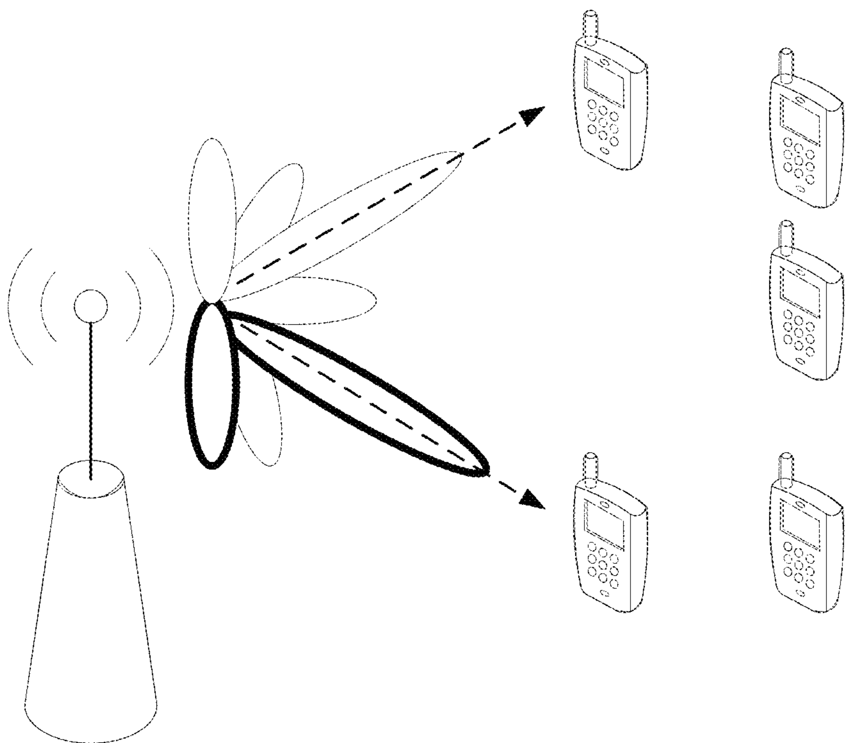
FIG. 1 is a schematic diagram of a scenario in which an access network device serves a plurality of terminal devices according to an embodiment of this application.

For example, FIG. 1 shows a scenario in which an access network device serves a plurality of terminal devices. In a wireless communication system, one access network device simultaneously serves a plurality of terminal devices. The access network device fully utilizes space domain resources of an antenna to communicate with the plurality of terminal devices. Herein, a quantity of terminal devices is denoted as k. An ith terminal device is used as an example, and the ith terminal device receives k signals. One signal is a wanted signal, and remaining signals are interfering signals. The k signals received by the ith terminal device meet the following formula:

$$R_i = H_i\left(W_i s_i + \sum\nolimits_{k \neq i} W_k s_k\right),$$

where $R_i$ indicates a signal received by the ith terminal device, $H_i$ indicates channel information corresponding to the signal received by the ith terminal device, W; represents an ith transmission weight, $s_i$ indicates an ith signal, $W_k$ indicates a kth transmission weight, $s_k$ indicates a kth signal, a value of i is a positive integer, 1≤i≤k, and the transmission weight $W_k$ is as follows:

$$W_k = \begin{bmatrix} H_1 \\ H_2 \\ \vdots \\ H_k \end{bmatrix}^{+}_{(:,k)},$$

where (:, k) indicates to take all elements in a kth column, and theoretically, a function of precoding is to design $W_k$ based on channel information to make $H_i W_k, \forall_i \neq k$ as small as possible, so as to reduce interference between different signals.

A minimum mean square error (MMSE) is a common method of precoding methods. In this method, a noise factor is considered in a system design, and interference caused by noise is minimized through corresponding processing, so that system performance is improved. A basic principle of this method is to minimize a mean square value of an error between a transmitted signal and a received signal. A specific algorithm of this method is as follows:

$$\begin{cases} W_k = \beta_{mmse} F_{MMSE} \\ F_{MMSE} = H^H\left(HH^H + \frac{K\sigma^2}{P_{total}} I_k\right)^{-1} \\ \beta_{mmse} = \sqrt{\frac{P_{total}}{\mathrm{trace}\left(F_{MMSE} F_{MMSE}^H\right)}} \end{cases}, \quad \text{Formula (2)}$$

where $F_{MMSE}$ indicates an unnormalized precoding matrix, $P_{total}$ indicates a total transmit power, H indicates channel information, k indicates a quantity of terminal devices (or a quantity of beams), $\sigma^2$ indicates a noise power, $I_k$ indicates a k-dimensional identity matrix, trace indicates a trace operation, the superscript −1 indicates to calculate an inverse of a matrix, and the superscript H indicates to calculate a transpose of a matrix.

It can be learned from the formula (2) that the precoding matrix is obtained through calculation based on the channel information. In a related technology, an access network device determines a precoding matrix in the following two manners.

Manner 1: An access network device determines a precoding matrix based on channel reciprocity.

For example, in a time-division duplex (TDD) system, a same frequency band is used in an uplink channel and a downlink channel, and the uplink channel and the downlink channel are reciprocal (to be specific, fading of the uplink channel and fading of the downlink channel are basically the same). An access network device side determines channel information of the uplink channel based on an uplink reference signal. Because the uplink channel and the downlink channel are reciprocal, the access network device determines that the downlink channel has similar channel characteristics. Therefore, the access network device calculates a precoding matrix based on the measured channel information of the uplink channel, to send a downlink signal.

Manner 2: An access network device determines a precoding matrix based on channel information fed back by a terminal device.

For example, in a frequency-division duplex (FDD) system or a TDD system, an access network device sends a downlink reference signal to a terminal device. Correspondingly, the terminal device receives the downlink reference signal from the access network device. Then the terminal device measures the downlink reference signal to obtain channel information of a downlink channel. The terminal device notifies, based on the channel information of the downlink channel, the access network device of a precoding matrix to be used by the access network device.

In Manner 2, the terminal device notifies, by using a precoding matrix indication (PMI), the access network device of a required precoding matrix. The access network device determines some parameters of the precoding matrix according to the PMI, to restore the precoding matrix. Herein, there are a plurality of precoding codebook modes. In different codebook modes, manners of mapping indication parameters (for example, $i_{1,1}$, $i_{1,2}$, $i_{1,3}$, and $i_2$) to codebook parameters (for example, l, m, and n) are different. The following describes different codebook modes by using two examples: “Example 1 and Example 2”.

Example 1: Table 1(a) shows a codebook in a codebook mode 1. Parameters of the PMI specifically include, $i_{1,1}$, $i_{1,2}$, $i_{1,3}$, $i_2$, and $$i_1 = \begin{cases} [\, i_{1,1} \quad i_{1,2} \,] & \upsilon \notin \{2, 3, 4\} \\ [\, i_{1,1} \quad i_{1,2} \quad i_{1,3} \,], & \upsilon \in \{2, 3, 4\} \end{cases}, \text{ where } \upsilon$$

indicates a quantity of data layers. When a value of υ is 1, the terminal device does not need to feed back the parameter $i_{1,3}$. Table 1(a) shows a manner of mapping indication parameters (for example, $i_{1,1}$, $i_{1,2}$, and $i_2$) to codebook parameters (for example, l, m, and n) in the codebook mode 1.

TABLE 1(a)

| Codebook mode 1 | | | |
|---|---|---|---|
| $i_{1,1}$ | $i_{1,2}$ | $i_2$ | |
| 0, 1, . . . _ _ − 1 | 0, . . . _ _ −1 | 0, 1, 2, 3 | $W^{(1)}_{i_{1,1},i_{1,2},i_2}$ |

TABLE 1(a)-continued

| Codebook mode 1 | | |
|---|---|---|
| $i_{1,1}$ | $i_{1,2}$ | $i_2$ |
| $W^{(1)}_{l,m,n} = \frac{1}{\sqrt{P_{CSI-RS}}}\begin{bmatrix} v_{l,m} \\ \varphi_n v_{l,m} \end{bmatrix}$ | | |

In Table 1(a), $$W^{(1)}_{l,m,n}$$

indicates a precoding matrix. For details about a calculation process of $v_{l,m}$ and $\varphi_n$, refer to a formula (3). A value of $i_{1,1}$ is a value in 0, 1, . . . −1. A value of m is the same as the value of $i_{1,2}$. A value of $i_{1,2}$ is a value in 0, . . . −1. A value of m is the same as the value of $i_{1,2}$. A value of $i_2$ is a value in 0,1,2,3. A value of n is the same as the value of $i_2$. $P_{CSI-RS}$ indicates a power of a reference signal. For a specific calculation process of the precoding matrix $$W^{(1)}_{l,m,n},$$

refer to the conventional technology. Details are not described herein again.

Example 2: Table 1(b) shows a codebook in a codebook mode 2. Parameters of the PMI in Example 2 are the same as those in Example 1. A case in which the value of υ is 1 is still used as an example, and the terminal device does not need to feed back the parameter $i_{1,3}$. Table 1(b) shows a manner of mapping indication parameters (for example, $i_{1,1}$, $i_{1,2}$, and $i_2$) to codebook parameters (for example, l, m, and n) in the codebook mode 2.

TABLE 1(b)

| Codebook mode 2, $N_2 > 1$ | | | | | |
|---|---|---|---|---|---|
| $i_{1,1}$ | $i_{1,2}$ | $i_2$ | | | |
| | | 0 | 1 | 2 | 3 |
| $0, 1, \ldots \frac{N_1O_1}{2} - 1$ | $0, 1, \ldots \frac{N_2O_2}{2} - 1$ | $W^{(1)}_{2i_{1,1},2i_{1,2},0}$ | $W^{(1)}_{2i_{1,1},2i_{1,2},1}$ | $W^{(1)}_{2i_{1,1},2i_{1,2},2}$ | $W^{(1)}_{2i_{1,1},2i_{1,2},3}$ |
| | | 4 | 5 | 6 | 7 |
| $0, 1, \ldots \frac{N_1O_1}{2} - 1$ | $0, 1, \ldots \frac{N_2O_2}{2} - 1$ | $W^{(1)}_{2i_{1,1}+1,2i_{1,2},0}$ | $W^{(1)}_{2i_{1,1}+1,2i_{1,2},1}$ | $W^{(1)}_{2i_{1,1}+1,2i_{1,2},2}$ | $W^{(1)}_{2i_{1,1}+1,2i_{1,2},3}$ |
| | | 8 | 9 | 10 | 11 |
| $0, 1, \ldots \frac{N_1O_1}{2} - 1$ | $0, 1, \ldots \frac{N_2O_2}{2} - 1$ | $W^{(1)}_{2i_{1,1},2i_{1,2}+1,0}$ | $W^{(1)}_{2i_{1,1},2i_{1,2}+1,1}$ | $W^{(1)}_{2i_{1,1},2i_{1,2}+1,2}$ | $W^{(1)}_{2i_{1,1},2i_{1,2}+1,3}$ |
| | | 12 | 13 | 14 | 15 |
| $0, 1, \ldots \frac{N_1O_1}{2} - 1$ | $0, 1, \ldots \frac{N_2O_2}{2} - 1$ | $W^{(1)}_{2i_{1,1}+1,2i_{1,2}+1,0}$ | $W^{(1)}_{2i_{1,1}+1,2i_{1,2}+1,1}$ | $W^{(1)}_{2i_{1,1}+1,2i_{1,2}+1,2}$ | $W^{(1)}_{2i_{1,1}+1,2i_{1,2}+1,3}$ |
| $W^{(1)}_{l,m,n} = \frac{1}{\sqrt{P_{CSI-RS}}}\begin{bmatrix} v_{l,m} \\ \varphi_n v_{l,m} \end{bmatrix}$ | | | | | |

In Table 1(b), $$W_{l,m,n}^{(1)}$$

indicates a precoding matrix. A value of $i_{1,1}$ is a value in $$0, 1, \ldots, \frac{N_1 O_1}{2} - 1.$$

A value of $i_{1,2}$ is a value in $$0, \ldots, \frac{N_2 O_2}{2} - 1.$$

A value of $i_2$ is a value ranging from 0 to 15. In the codebook mode shown in Table 1(b), when the value of $i_2$ varies, a manner of mapping indication parameters (for example, $i_{1,1}$, $i_{1,2}$, and $i_2$) to codebook parameters (for example, l, m, and n) also changes. For example, when, $i_2=0$, $l=2i_{1,1}$, $m=2i_{1,2}$, and $n=0$, For another example, when $i_2=5$, $l=2i_{1,1}+1$, $m=2i_{1,2}$, and $n=1$. $P_{CSI\text{-}RS}$ indicates a power of a reference signal. For a specific calculation process of the precoding matrix $$W_{l,m,n}^{(1)},$$

refer to the conventional technology. Details are not described herein again. $v_{l,m}$ and $\varphi_n$ meet the following formula (3):

$$\begin{cases} \varphi_n = e^{j\pi n/2} \\ u_m = \begin{cases} \left[ 1 \quad e^{j\frac{2\pi m}{O_2 N_2}} \quad \ldots \quad e^{j\frac{2\pi m(N_2-1)}{O_2 N_2}} \right] & N_2 > 1 \\ 1 & N_2 = 1 \end{cases} \\ v_{l,m} = \left[ u_m \quad e^{j\frac{2\pi l}{O_1 N_1}} u_m \quad \ldots \quad e^{j\frac{2\pi l(N_1-1)}{O_1 N_1}} u_m \right]^T. \end{cases} \quad \text{Formula (3)}$$

Figure 2:
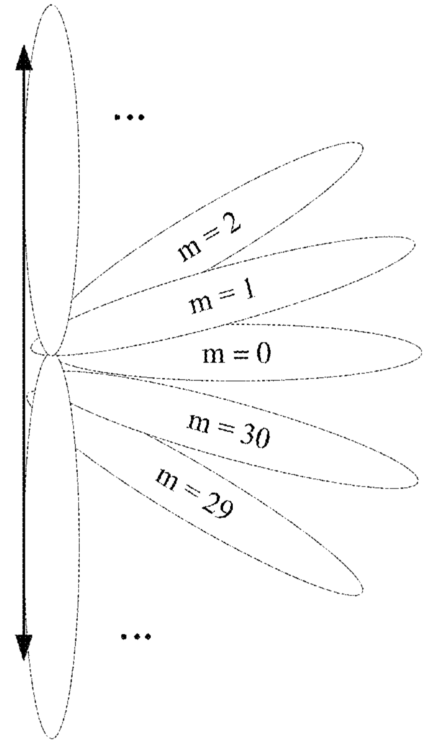
FIG. 2 is a schematic diagram of beam locations according to an embodiment of this application.

Herein, a final effect of precoding matrix selection is a beam direction. As shown in FIG. 2, different precoding parameters correspondingly generate beams in different directions. A value of m is used as an example, and different values of m indicate different beam directions. FIG. 2 shows beam directions when values of m are "0, 1, 2, 29, and 30".

To sum up, it can be learned that in Manner 1, the terminal device does not need to feed back channel information, and overheads of transmission resources are low. However, Manner 1 is usually applicable to a scenario in which an uplink frequency and a downlink frequency are the same, for example, a TDD communication mode. Although Manner 2 is applicable to TDD and FDD communication modes, the terminal device needs to feed back channel information, and overheads of transmission resources are high.

Figure 3:
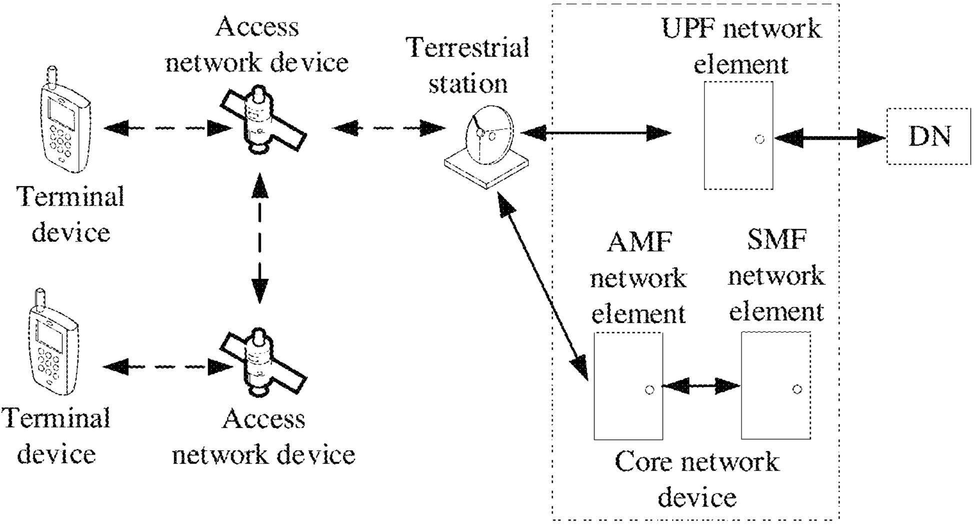
FIG. 3 is a schematic diagram of an architecture of a communication system according to an embodiment of this application.

In view of this, embodiments of this application provide a precoding method. First, a system architecture included in embodiments of this application is provided. As shown in FIG. 3, the system includes an access network device, a plurality of terminal devices that communicate with the access network device, and a core network device that communicates with the access network device.

The communication system shown in FIG. 3 may be applied to a current long term evolution (LTE) or long term evolution-advanced (LTE advanced, LTE-A) system, or may be applied to a 5th-generation (5-generation, 5G) mobile communication technology network that is currently being formulated or another future network, or certainly may be applied to an LTE and 5G hybrid network system, a device-to-device (D2D) communication system, a machine-to-machine (machine to machine, M2M) communication system, an internet of things (IoT) or internet of vehicles communication system, or another system. This is not specifically limited in embodiments of this application. In different networks, the core network device, the access network device, and the terminal device in the foregoing communication system may correspond to different names. A person skilled in the art may understand that the names do not constitute a limitation on the devices.

The core network device referred to in embodiments of this application is an apparatus that is deployed in a core network and that is configured to serve the terminal device. In systems using different radio access technologies, core network devices with similar wireless communication functions may have different names. For example, when the precoding method in embodiments of this application is applied to a 5G system, the core network device may be an access and mobility management function (AMF) network element, a session management function (SMF) network element, a user plane function (UPF) network element, or the like. The UPF network element processes user-plane data. The AMF network element and the SMF network element process control-plane signaling. When the precoding method in embodiments of this application is applied to an LTE system, the core network device may be a mobility management entity (MME). For ease of description only, in embodiments of this application, the foregoing apparatuses that are capable of serving the terminal device are collectively referred to as the core network device.

The access network device is an apparatus that is deployed in a radio access network and that is configured to provide a wireless communication function. Optionally, the access network device included in embodiments of this application may include but is not limited to a macro base station, a micro base station (also referred to as a small cell), a relay station, a transmission reception point (TRP), a next-generation network node (gNodeB, gNB), an evolved NodeB connected to a next-generation core network (ng evolved NodeB, ng-eNB), and the like in various forms, or may include a radio access network device in a non-3rd Generation Partnership Project (3GPP) system, for example, a wireless local area network (WLAN) access device. As described above, all or some functional modules of the access network device may be deployed on a high altitude platform station or a satellite, or may be deployed on a high-altitude communication device in another form. Correspondingly, the access network device may be a high altitude platform station, a satellite, or another similar device that connects the terminal device to the core network device. The high altitude platform station may include at least one of the following: a satellite, an unmanned aerial vehicle, or a hot air balloon.

The terminal device, also referred to as a terminal apparatus, user equipment (UE), a mobile station (MS), a mobile terminal (MT), or the like, is a device that provides voice/data connectivity for a user, for example, a handheld device or a vehicle-mounted device that has a wireless connection function. The terminal device may be specifically a mobile phone, a tablet computer, a notebook computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a terminal device in a future 5G communication network or a communication network after 5G, or the like. This is not limited in embodiments of this application.

In the system architecture shown in FIG. 3, the system further includes a terrestrial gateway and a data network (DN). Herein, an interface for communication between the terminal device and the access network device may be an air. An interface for communication between the access network device and the terrestrial gateway may be an NG interface. An interface for communication between the terrestrial gateway and the core network device may be an NG interface. The core network device may be connected only to one terrestrial gateway. In this case, the access network device may be connected to the core network device through the one terrestrial gateway. Details are shown in FIG. 3. The core network device may be connected to more than one terrestrial gateway. In this case, the access network device may be connected to the core network device through any one of the more than one terrestrial gateway (not shown in FIG. 3). The core network device (for example, the UPF network element) may communicate with an entity, a network element, or the like in the data network (DN) through an interface (for example, an N6 interface).

It should be noted that manners of communication between only some network elements are described above, and other network elements may also communicate with each other in some connection manners. Details are not described herein in this embodiment of this application.

The system architecture and service scenarios described in embodiments of this application are intended to describe technical solutions in embodiments of this application more clearly, and do not constitute a limitation on technical solutions provided in embodiments of this application. A person of ordinary skill in the art may learn that technical solutions provided in embodiments of this application are also applicable to a similar technical problem as a network architecture evolves and a new service scenario emerges.

The following specifically describes the precoding method provided in embodiments of this application.

It should be noted that in the following embodiments of this application, names of messages between network elements, names of parameters in messages, or the like are merely examples, and may be other names during specific implementation. This is uniformly described herein, and details are not described below again.

Figure 4:
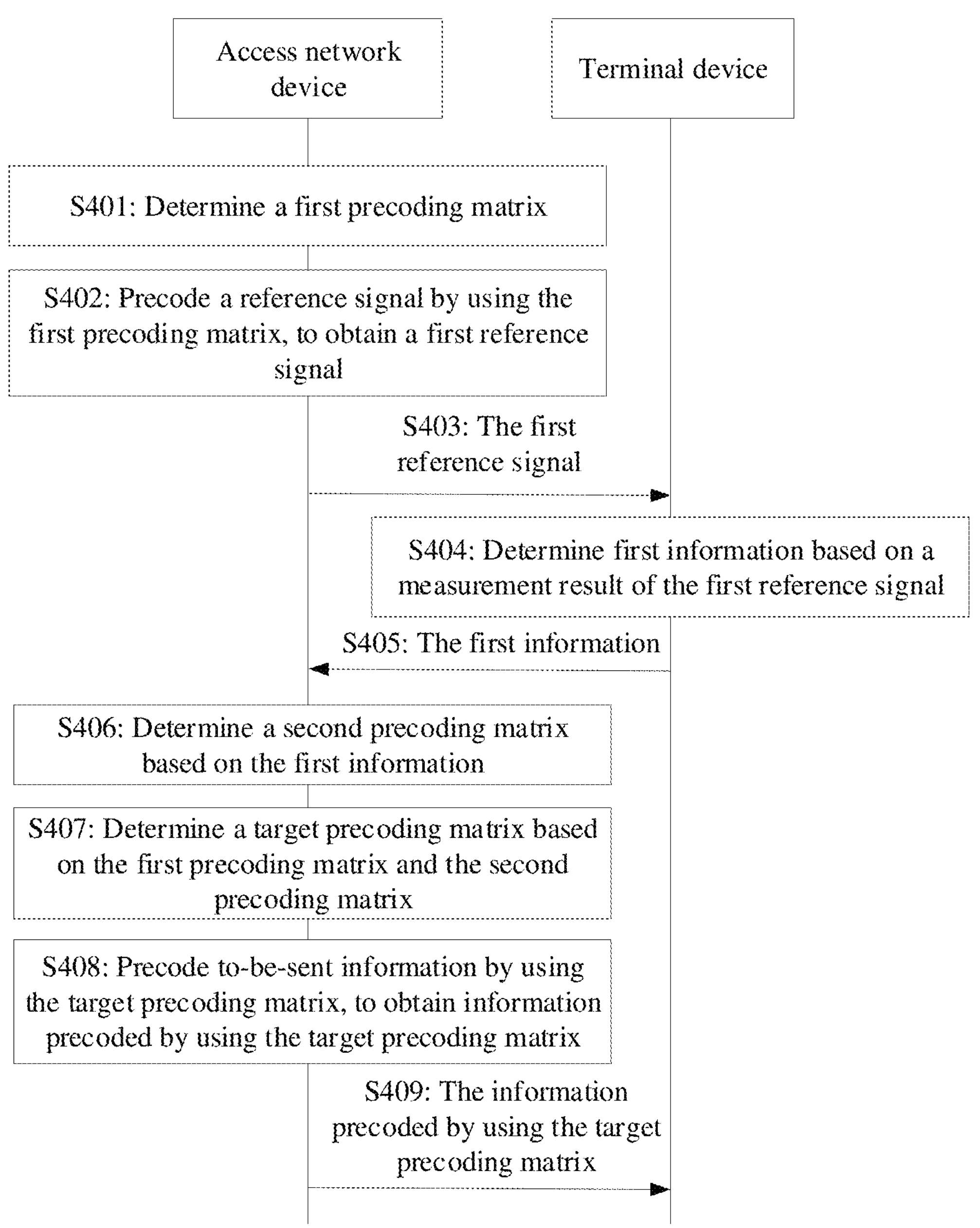
FIG. 4 is a schematic flowchart of a precoding method according to an embodiment of this application.

An embodiment of this application provides a first precoding method, and the precoding method is applied to a precoding process. As shown in FIG. 4, the precoding method includes the following steps.

S401: An access network device determines a first precoding matrix.

The first precoding matrix is a predictable matrix.

For example, the first precoding matrix is denoted as W1. The first precoding matrix may be a precoding matrix in the conventional technology, or may be a coding matrix determined based on relative locations of the access network device and a target reference point. Herein, the target reference point may be a reference point in a beam coverage area (for example, a center of the beam coverage area), or may be a geographical location of a service area of the access network device. The beam is transmitted by the access network device. One beam corresponds to one target reference point. Therefore, when there are K beams, a quantity of target reference points is also K, where K≥1. Herein, a channel between the access network device and the target reference point is described as a "first channel". That is, the first precoding matrix is a basic precoding matrix determined based on the first channel.

For example, a specific implementation process of S401 may be but is not limited to the following Manner 1 and Manner 2.

Manner 1: The access network device determines the first precoding matrix based on location information. For details, refer to S4011 to S4013 shown in FIG. 5(*a*).

S4011: The access network device obtains the location information.

The location information includes at least one of the following:

1. Information about the relative locations of the access network device and the target reference point, for example, a spacing distance and an angle between the access network device and the target reference point.
2. A geographical location of the target reference point. Herein, after obtaining the geographical location of the target reference point, the access network device may determine information about the relative locations of the access network device and the target reference point with reference to a location of the access network device.

S4012: The access network device determines channel information of the first channel based on the location information.

The first channel is a channel between the access network device and the target reference point.

For example, K target reference points are still used as an example, and the channel information of the first channel is as follows:

$$H = \begin{bmatrix} H_{11}, & H_{12}, & \dots & H_{1K}, \\ H_{21}, & H_{22}, & \dots & H_{2K}, \\ & & \dots & \\ H_{K1}, & H_{K2}, & \dots & H_{KK}, \end{bmatrix},$$

where $H_{11}$ indicates a parameter of channel fading experienced by a wanted signal received by a $1^{st}$ terminal device, $H_{12}$ indicates a parameter of channel fading experienced by a $2^{nd}$ interfering signal received by the $1^{st}$ terminal device, $H_{1K}$ indicates a parameter of channel fading experienced by a Kth interfering signal received by the $1^{st}$ terminal device, $H_{21}$ indicates a parameter of channel fading experienced by a $1^{st}$ interfering signal received by a $2^{nd}$ terminal device, $H_{22}$ indicates a parameter of channel fading experienced by a wanted signal received by the $2^{nd}$ terminal device, and $H_{2K}$ indicates a parameter of channel fading experienced by a Kth interfering signal received by the $2^{nd}$ terminal device, $H_{K1}$ indicates a parameter of channel fading experienced by a $1^{st}$ interfering signal received by a Kth terminal device, $H_{K2}$ indicates a parameter of channel fading experienced by a $2^{nd}$ interfering signal received by the Kth terminal device, and $H_{KK}$ indicates a parameter of channel fading experienced by a wanted signal received by the Kth terminal device.

For example, channel fading of a kth terminal device meets the following relationship:

$$H_{kk} = \frac{Gt_k Gr_k}{PL_k},\ H_{ki} = \frac{Gt_{ki} Gr_k}{PL_k}, \qquad \text{Formula (4)}$$

where k is a positive integer, $1 \leq k \leq K$, $H_{kk}$ indicates a parameter of channel fading experienced by a wanted signal received by the kth terminal device, $H_{ki}$ indicates a parameter of channel fading experienced by an ith interfering signal received by the kth terminal device, i is a positive integer, $1 \leq i \leq (k-1)$, $PL_k$ indicates a free path propagation loss corresponding to the kth terminal device, $Gt_k$ indicates a transmit gain of a kth first reference signal at a transmit end, and $Gr_k$ indicates receive antenna gains at different included angles of the kth terminal device relative to an antenna direction.

Herein, when the antenna gains are a normalized value, $Gt_k=1$. $Gt_{ki}$ is determined based on an included angle between an $i^{th}$ target reference point and the kth terminal device relative to the access network device. $Gt_k$ is determined based on a normalized antenna model. For example, Table 2 shows parameters of a normalized antenna model. In Table 2, θ indicates an included angle relative to an antenna direction. When a value of θ is 0, a value of $Gr_k$ is 1. When "a value of an absolute value of θ (namely, |θ|) is greater than 0 and less than or equal to $$90°", Gr_k = 4\left|\frac{J_1(la\sin\theta)}{la\sin\theta}\right|.$$

Herein, $J_1$ indicates a first-order function of a Bessel function of the first kind, and a indicates a radius of an antenna aperture. $1=2\pi f_c/c$. Herein, $f_c$ is a center frequency, and c is a speed of light.

TABLE 2

| | |
|---|---|
| 1 | θ = o |
| $4\left\|\frac{J_1(la\sin\theta)}{l}\right\|$ | o < \|θ\| ≤ 90° |

$PL_k$ meets the following relationship:

$$PL_k = 10^\wedge(0.05*(32.45 + 20\log_{10}(f_c) + 20\log_{10}(d))), \quad \text{Formula (5)}$$

where $f_c$ is the center frequency, and d is a distance from the access network device to the kth terminal device.

S4013: The access network device determines the first precoding matrix based on the channel information of the first channel.

For example, the access network device performs an operation on the channel information of the first channel by using the formula (2), to obtain the first precoding matrix.

Therefore, the access network device can determine the first precoding matrix based on the location information. That is, for the access network device, the first precoding matrix is a predictable matrix.

Manner 2: At a $1^{st}$ moment (that is, a moment at which no terminal device reports a channel measurement result to the access network device), the access network device determines the first precoding matrix in Manner 1, or the access network device uses a precoding matrix in the conventional technology as the first precoding matrix. The access network device may determine a target precoding matrix at the $1^{st}$ moment by performing S402 to S407. In a communication process after the $1^{st}$ moment, for example, a first precoding matrix at an $i^{th}$ moment is a target precoding matrix at an $(i-1)^{th}$ moment, where i is a positive integer, and $2 \leq i$. That is, the access network device uses a target precoding matrix at a previous moment as a first precoding matrix at a current moment. Therefore, for the access network device, the first precoding matrix is still a predictable matrix.

S402: The access network device precodes a reference signal by using the first precoding matrix, to obtain a first reference signal.

For example, when the access network device transmits K beams, there are K first reference signals. Each of the K beams transmits one first reference signal. For a specific implementation process of precoding, by the access network device, the reference signal by using the first precoding matrix, refer to the conventional technology. Details are not described herein.

S403: The access network device sends the first reference signal to a terminal device. Correspondingly, the terminal device receives the first reference signal from the access network device.

The terminal device is located in an area range corresponding to the target reference point. For example, the target reference point is a center point of the beam coverage area, and the terminal device is located in the beam coverage area.

S404: The terminal device determines first information based on a measurement result of the first reference signal.

The measurement result of the first reference signal includes equivalent channel information of a target channel. For example, when a quantity of first reference signals is K, a measurement result, determined by a $j^{th}$ terminal device, of a first reference signal is denoted as $\tilde{H}_j=[\tilde{h}_{j1}, \tilde{h}_{j2}, \tilde{h}_{j3}, \ldots \tilde{h}_{jK}]$, where $\tilde{h}_{j1}$ indicates a channel attenuation parameter of a $1^{st}$ first reference signal received by the $j^{th}$ terminal device, $\tilde{h}_{j2}$ indicates a channel attenuation parameter of a $2^{nd}$ first reference signal received by the $j^{th}$ terminal device, $\tilde{h}_{j3}$ indicates a channel attenuation parameter of a $3^{rd}$ first reference signal received by the $j^{th}$ terminal device, and $\tilde{h}_{jk}$ indicates a channel attenuation parameter of a Kth first reference signal received by the $j^{th}$ terminal device. Herein, for the $j^{th}$ terminal device, the K first reference signals include one wanted first reference signal and (K−1) interfering first reference signals.

For example, the first information includes information about the target channel between the access network device and the terminal device. The target channel is a channel for transmitting the first reference signal. For example, the first information is obtained by quantizing the measurement result of the first reference signal. The first information includes at least one of amplitude information of the target channel and phase information of the target channel. Herein, the measurement result of the first reference signal includes an amplitude measurement result of the first reference signal and a phase measurement result of the first reference signal. The amplitude information in the first information is obtained by quantizing the amplitude measurement result of the first reference signal, and the phase information in the first information is obtained by quantizing the phase measurement result of the first reference signal. For example, the following describes a specific process of quantizing the "measurement result of the first reference signal":

$\tilde{H}_j=[\tilde{h}_{j1}, \tilde{h}_{j2}, \tilde{h}_{j3}, \ldots \tilde{h}_{jK}]=[\tilde{\varphi}_{j1}\tilde{p}_{j1}, \tilde{\varphi}_{j2}\tilde{p}_{j2}, \tilde{\varphi}_{j3}\tilde{p}_{j3}, \ldots, \tilde{\varphi}_{jK}\tilde{p}_{jK}]$, where $\varphi_{j1}$ indicates a phase parameter of the channel attenuation parameter $\tilde{h}_{j1}$, $\tilde{p}_{j1}$ indicates an amplitude parameter of the channel attenuation parameter $\tilde{h}_{j1}$, $\varphi_{j2}$ indicates a phase parameter of the channel attenuation parameter $\tilde{h}_{j2}$, $\tilde{p}_{j2}$ indicates an amplitude parameter of the channel attenuation parameter $\tilde{h}_{j2}$, $\varphi_{j3}$ indicates a phase parameter of the channel attenuation parameter $\tilde{h}_{j3}$, $\tilde{p}_{j3}$ indicates an amplitude parameter of the channel attenuation parameter $\tilde{h}_{j3}$, $\tilde{\varphi}_{jK}$ indicates a phase parameter of the channel attenuation parameter $\tilde{h}_{jK}$, and $\tilde{p}_{jK}$ indicates an amplitude parameter of the channel attenuation parameter $\tilde{h}_{jK}$. For example, a quantization result of $\tilde{h}_{jk}$ meets the following relationship:

$$\tilde{h}_{jk} = \tilde{h}_{l,m,N_1,N_{2,1},N_{2,2},(n)}^{(v,j,k)} = \tilde{\varphi}_{l,N_1}^{(v,j,k)} \tilde{p}_{m,N_{2,1},N_{2,2}}^{(v,j,k)} = e^{j(-\pi+2\pi l/N_1)} \cdot N_{2,1} \cdot 1e^{-N_{2,2}} \cdot m, \quad \text{Formula (6)}$$

where k is a positive integer, 1≤k≤K, l indicates a phase indication parameter, m indicates an amplitude indication parameter, $N_1$ indicates a phase resolution (phase resolution) parameter, $N_{2,1}$ and $N_{2,2}$ indicates an amplitude resolution parameter, and v indicates a quantity of layers. Herein, when the access network device sends a plurality of layers of data to the terminal device, the terminal device feeds back, to the access network device, channel information corresponding to the plurality of layers of data. Channel elements at each layer meet the operation relationship in the formula (6).

Herein, the phase indication parameter l and the amplitude indication parameter m separately perform indication based on levels to reduce overheads of resources. For example, the phase information includes two parameters: $i_{1,1}$ and $i_{1,2}$; and the amplitude information includes three parameters: $i_{2,1}$, $i_{2,2}$, and $i_{2,3}$. In addition, $i_3$ indicates a mapping relationship that the information in the first information meets. Details are shown in Table 3.

TABLE 3

| $i_{1,1}$ $i_{1,2}$ $i_{2,1}$ $i_{2,2}$ $i_{2,3}$ | $i_3$ | | |
|---|---|---|---|
| | 0 | 1 | 2 |
| 0, 1, 2, 3, 4, 5 . . . | $l = a_{1,1}i_{1,1} + a_{1,2}i_{1,2}$ $m = b_{1,1}i_{2,1} + b_{1,2}i_{2,2} + b_{1,3}i_{2,3}$ | $l = a_{2,1}i_{1,1} + a_{2,2}i_{1,2}$ $m = b_{2,1}i_{2,1} + b_{2,2}i_{2,2} + b_{2,3}i_{2,3}$ | $l = a_{3,1}i_{1,1} + a_{3,2}i_{1,2}$ $m = b_{3,1}i_{2,1} + b_{3,2}i_{2,2} + b_{3,3}i_{2,3}$ |
| | 3 | 4 | 5 |
| 0, 1, 2, 3, 4, 5 . . . | $l = a_{4,1}i_{1,1} + a_{4,2}i_{1,2}$ $m = b_{4,1}i_{2,1} + b_{4,2}i_{2,2} + b_{4,3}i_{2,3}$ | $l = a_{5,1}i_{1,1} + a_{5,2}i_{1,2}$ $m = b_{5,1}i_{2,1} + b_{5,2}i_{2,2} + b_{5,3}i_{2,3}$ | $l = a_{6,1}i_{1,1} + a_{6,2}i_{1,2}$ $m = b_{6,1}i_{2,1} + b_{6,2}i_{2,2} + b_{6,3}i_{2,3}$ |
| | 6 | 7 | . . . |
| 0, 1, 2, 3, 4, 5 . . . | $l = a_{7,1}i_{1,1} + a_{7,2}i_{1,2}$ $m = b_{7,1}i_{2,1} + b_{7,2}i_{2,2} + b_{7,3}i_{2,3}$ | $l = a_{8,1}i_{1,1} + a_{8,2}i_{1,2}$ $m = b_{8,1}i_{2,1} + b_{8,2}i_{2,2} + b_{8,3}i_{2,3}$ | . . . |

When the terminal device receives k first reference signals, the terminal device determines that the first information includes k groups of parameters (that is, k groups of $i_{1,1}$, $i_{1,2}$, $i_{2,1}$, $i_{2,2}$, and $i_{2,3}$) and a common parameter $i_3$, or the terminal device determines that the first information includes k groups of parameters (that is, k groups of $i_{1,1}$, $i_{1,2}$, $i_{2,1}$, $i_{2,2}$, $i_{2,3}$, and $i_3$). As shown in Table 3, when $i_3$=0, $a_{1,1}$=1, $a_{1,2}$=0.1, $b_{1,1}$=0.1, $b_{1,2}$=0.01, and $b_{1,3}$=0.001, if l=1.1, m=0.123, $N_1$=5, $N_{2,1}$=0.3, and $N_{2,2}$=3, the terminal device queries Table 3, and learns that $l=a_{1,1}i_{1,1}+a_{1,2}i_{1,2}$=1.1 and $m=b_{1,1}i_{2,1}+b_{1,2}i_{2,2}+b_{1,3}i_{2,3}$=0.123. Therefore, the terminal device determines that values of parameters in the first information are as follows: $i_{1,1}$=1, $i_{1,2}$=1, $i_{2,1}$=1, $i_{2,2}$=2, and $i_{2,3}$=3. Herein, the parameters $a_{X,Y}$ and $b_{X,Y}$ in Table 3 are predefined parameters, where a value of X is 1, 2, or 3, and a value of Y is 1 or 2.

It should be noted that a resolution (for example, $N_1$ and $N_{2,1}$ and $N_{2,2}$ in the formula (6)) corresponding to the first information may be preconfigured, or may be determined by the terminal device, or may be determined by the access network device. The following uses two cases as examples for detailed description.

Case 1: The resolution corresponding to the first information is determined by the access network device. For details, refer to descriptions of S4041 and S4042 shown in FIG. 5(*b*).

S4041: The access network device determines the resolution corresponding to the first information.

For example, the resolution corresponding to the first information is determined based on the relative locations of the access network device and the target reference point. Alternatively, the resolution corresponding to the first information is determined based on relative locations of the access network device and the service area. Alternatively, the resolution corresponding to the first information is determined based on an access network device type and a communication elevation angle. Herein, access network device types are classified based on orbit heights, and include two types: a low earth orbit (LEO) and a geostationary earth orbit (GEO). An orbital height of the LEO is approximately 400 km to 2000 km. An orbital height of the GEO is greater than 2000 km. For example, Table 4 shows a correspondence between a resolution and each of an access network device type and a communication elevation angle.

TABLE 4

| Access network device type | Communication elevation angle (degrees) | $N_1$ | $N_{2,1}$ | $N_{2,2}$ |
|---|---|---|---|---|
| LEO (600 km) | 10-30 or 150-170 | 4 | 0.1 | 0 |
| | 30-50 or 130-150 | 5 | 0.2 | 1 |
| | 50-70 or 110-130 | 6 | 0.3 | 2 |
| | 70-90 or 90-110 | 7 | 0.4 | 3 |
| LEO (1200 km) | 10-30 or 150-170 | 4 | 0.5 | 0 |
| | 30-50 or 130-150 | 5 | 0.6 | 1 |
| | 50-70 or 110-130 | 6 | 0.7 | 2 |
| | 70-90 or 90-110 | 7 | 0.8 | 3 |
| GEO | 10-30 or 150-170 | 4 | 0.9 | 0 |
| | 30-50 or 130-150 | 5 | 1 | 1 |
| | 50-70 or 110-130 | 6 | 1.1 | 2 |
| | 70-90 or 90-110 | 7 | 1.2 | 3 |

As shown in Table 4, when a height of an orbit on which the access network device is located is 600 km, if a communication elevation angle is 20 degrees, the access network device determines that the resolution of the first information is as follows: A value of $N_1$ is 4, a value of $N_{2,1}$ is 0.1, and a value of $N_{2,2}$ is 0. When a type of an orbit on which the access network device is located is the GEO, if a communication elevation angle is 20 degrees, the access network device determines that the resolution of the first information is as follows: A value of $N_1$ is 4, a value of $N_{2,1}$ is 0.9, and a value of $N_{2,2}$ is 0. Therefore, the access network device can determine the resolution of the first information by querying Table 4 based on an orbit type and a communication elevation angle of the access network device.

S4042: The access network device sends indication information to the terminal device. Correspondingly, the terminal device receives the indication information from the access network device.

The indication information indicates the resolution corresponding to the first information. For example, a field related to the first information is added to a codebook config (codebook config) field in RRC signaling to carry the first information. For example, the field that carries the first information in the codebook config field is as follows:

```
CodebookConfig::= SEQUENCE {
...
Phase resolution (N1) BIT STRING (SIZE (8))
Amplitude resolution (N2,1) BIT STRING (SIZE (8))
Amplitude resolution (N2,2) BIT STRING (SIZE (8))
...
}.
```

The foregoing code shows the field that carries the first information in the codebook config field. $N_1$ indicates a phase resolution parameter, and is represented by using an 8-bit bit string. $N_{2,1}$ and $N_{2,2}$ indicate phase resolution parameters, and each are represented by using an 8-bit bit string. Herein, the 8-bit bit string is merely used as an example for description. When a value of the resolution changes, a quantity of bits in the bit string may be alternatively represented by using another quantity of bits. This is not limited in this embodiment of this application.

For example, the indication information includes an index number, so that the terminal device determines the resolution of the first information based on the index number in the indication information. Herein, different index numbers correspond to different resolutions. Details are shown in Table 5.

TABLE 5

| Index number | $N_1$ | $N_{2,1}$ | $N_{2,2}$ |
|---|---|---|---|
| 0 | 4 | 0.1 | 0 |
| 1 | 5 | 0.2 | 1 |
| 2 | 6 | 0.3 | 2 |
| 3 | 7 | 0.4 | 3 |
| 4 | 8 | 0.5 | 4 |
| 5 | 9 | 0.6 | 5 |
| 6 | 10 | 0.7 | 6 |
| 7 | 11 | 0.8 | 7 |
| 8 | 12 | 0.9 | 8 |
| ... | ... | ... | ... |

As shown in Table 5, when "a value of $N_1$ is 4, a value of $N_{2,1}$ is 0.1, and a value of $N_{2,2}$ is 0", the access network device determines that the index number is "0". That is, a value of the index number included in the indication information is "0".

Therefore, when the access network device determines the resolution of the first information, the access network device can send the indication information to the terminal device, to indicate the resolution of the first information, so that the terminal device quantizes the measurement result of the first reference signal.

Case 2: The resolution corresponding to the first information is determined by the terminal device. For details, refer to descriptions of S4043 and S4044 shown in FIG. 5(*c*).

S4043: The terminal device determines the resolution corresponding to the first information.

For example, the terminal device may determine the resolution of the first information based on an access network device type and a communication elevation angle. When the terminal device obtains the access network device type and the communication elevation angle, the terminal device may determine the resolution of the first information by querying Table 4.

For example, the terminal device may determine, based on the measurement result of the first reference signal, the resolution corresponding to the first information. For example, if results of two adjacent measurements on the first reference signal vary greatly, for example, the variation is greater than a specific threshold, the terminal device determines that the resolution corresponding to the first information decreases. Because the resolution corresponding to the first information decreases, correspondingly, a quantity of bits obtained by quantizing the measurement result of the first reference signal is reduced, to reduce overheads of resources. On the contrary, if results of two adjacent measurements on the first reference signal vary slightly, for example, the variation is less than a specific threshold, the terminal device determines that the resolution corresponding to the first information increases.

S4044: The terminal device sends, to the access network device, the resolution corresponding to the first information. Correspondingly, the access network device receives, from the terminal device, the resolution corresponding to the first information.

For example, the resolution corresponding to the first information may be carried in a channel state information (CSI) feedback report. Herein, the terminal device may alternatively determine an index number based on Table 5. For details, refer to related descriptions of S4042. Details are not described herein again. Therefore, the terminal device only needs to send the index number to the access network device, thereby reducing overheads of communication resources.

Therefore, the terminal device can alternatively autonomously determine the resolution of the first information, and feed back the resolution of the first information to the access network device, so that the access network device restores the measurement result of the first reference signal.

Content included in the first information varies at different moments. For example, first information at a $1^{st}$ moment includes channel information of the target channel at the $1^{st}$ moment, and first information at an $N^{th}$ moment includes differential information of the target channel at an $(N-1)^{th}$ moment and the $N^{th}$ moment. At an $i^{th}$ moment, the target channel is used to transmit a reference signal precoded by using a first precoding matrix corresponding to the $i^{th}$ moment. i and N are positive integers, $1 \le i \le N$, and $N \ge 2$. For related descriptions of the "$1^{st}$ moment" and the "$N^{th}$ moment", refer to related descriptions of S4013. Details are not described herein again.

For example, the $1^{st}$ moment is denoted as a moment t1, and a $2^{nd}$ moment is denoted as a moment t2. Equivalent channel information $\tilde{H}_{j(t1)}$ determined by the $j^{th}$ terminal device at the moment t1 is as follows:

$$\begin{aligned}\tilde{H}_{j(t1)} &= \left[\tilde{h}_{j1(t1)}, \tilde{h}_{j2(t1)}, \tilde{h}_{j3(t1)}, \ldots \tilde{h}_{jK(t1)}\right] \\ &= \left[\tilde{\varphi}_{j1(t1)}\tilde{p}_{j1(t1)}, \tilde{\varphi}_{j2(t1)}\tilde{p}_{j3(t1)}, \tilde{\varphi}_{j3(t1)}\tilde{p}_{j3(t1)}, \ldots, \tilde{\varphi}_{jK(t1)}\tilde{p}_{jK(t1)}\right].\end{aligned}$$

Equivalent channel information $\tilde{H}_{j(t2)}$ determined by the $j^{th}$ terminal device at the moment t2 is as follows:

$$\begin{aligned}\tilde{H}_{j(t2)} &= \left[\tilde{h}_{j1(t2)}, \tilde{h}_{j2(t2)}, \tilde{h}_{j3(t2)}, \ldots \tilde{h}_{jK(t2)}\right] \\ &= \left[\tilde{\varphi}_{j1(t2)}\tilde{p}_{j1(t2)}, \tilde{\varphi}_{j2(t2)}\tilde{p}_{j3(t2)}, \tilde{\varphi}_{j3(t2)}\tilde{p}_{j3(t2)}, \ldots, \tilde{\varphi}_{jK(t2)}\tilde{p}_{jK(t2)}\right].\end{aligned}$$

First, the $j^{th}$ terminal device determines a differential phase and a differential amplitude based on the equivalent channel information $\tilde{H}_{j(t1)}$ and the equivalent channel information $\tilde{H}_{j(t2)}$. A 1st first reference signal received by the $j^{th}$ terminal device is used as an example, and a differential phase and a differential amplitude meet the following relationship:

$$\begin{cases} \Delta\tilde{\varphi}_{j1} = \tilde{\varphi}_{j1(t2)} - \tilde{\varphi}_{j1(t1)} \\ \Delta\tilde{p}_{j1} = \tilde{p}_{j1(t2)} - \tilde{p}_{j1(t1)} \end{cases}. \quad \text{Formula (7)}$$

Herein, it is easily understood that, for a 2nd first reference signal to a Kth first reference signal that are received, the $j^{th}$ terminal device also performs differential processing according to the foregoing process, to obtain differential phases and differential amplitudes of K first reference signals.

Then the $j^{th}$ terminal device quantizes the differential phases and the differential amplitudes of the K first reference signals.

The differential phases meet the following relationship:

$$\Delta\tilde{\varphi}_{l,N_1}^{(v,j,k)} = e^{j\left(-\pi+2\pi l/N_1\right)} \text{ or } \Delta\tilde{\varphi}_{l,N_1}^{(v,j,k)} = e^{j\left(2\pi/N_1\cdot\left(l-N_1/2+1\right)\right)}.$$

Herein, $$\Delta\tilde{\varphi}_{l,N_1}^{(v,j,k)}$$

indicates the differential phases determined by the $j^{th}$ terminal device, k is a positive integer, $1 \le k \le K$, l indicates a phase indication parameter, $N_1$ indicates a phase resolution parameter, and v indicates a quantity of layers.

The differential amplitudes meet the following relationship:

$$\Delta\tilde{p}_{m,N_{2,1},N_{2,2}}^{(v,j,k)} = N_{2,1}\cdot 1e^{-N_{2,2}}\cdot m \text{ or } \Delta\tilde{p}_{m,N_{2,1},N_{2,2}}^{(v,j,k)} = N_{2,1}\cdot m.$$

Herein, $$\Delta\tilde{p}_{m,N_{2,1},N_{2,2}}^{(v,j,k)}$$

indicates the differential amplitudes determined by the $j^{th}$ terminal device, k is a positive integer, $1 \le k \le K$, m indicates an amplitude indication parameter, $N_{2,1}$ and $N_{2,2}$ indicate amplitude resolution parameters, and v indicates a quantity of layers.

The $j^{th}$ terminal device quantizes phase indication parameters and amplitude resolution parameters of the K first reference signals based on Table 3, to obtain parameters (that is, K groups of $i_{1,1}$, $i_{1,2}$, $i_{2,1}$, $i_{2,2}$, and $i_{2,3}$) of the K first reference signals. Therefore, the $j^{th}$ terminal device obtains the first information. In addition, when the $j^{th}$ terminal device provides the differential amplitudes and the differential phases for the access network device, the access network device may restore channel elements at the moment t2 based on information at the moment t1. The channel elements at the moment t2 meet the following relationship:

$$\tilde{h}_{l,m,N_1,N_{2,1},N_{2,2},(n)}^{(v)}(t_2) = e^{j\left(\tilde{\theta}(t_1)+\Delta\tilde{\varphi}_{l,N_1}^{(v)}\right)}\left(\tilde{p}(t_1) + \Delta\tilde{p}_{m,N_{2,1},N_{2,2}}^{(v)}\right), \quad \text{Formula (8)}$$

where $\tilde{h}_{l,m,N_1,N_{2,1},N_{2,2},(n)}^{(v)}(t_2)$, indicates the channel elements at the moment t2, l indicates a phase indication parameter, m indicates an amplitude indication parameter, $N_1$ indicates a phase resolution parameter, $N_{2,1}$ and $N_{2,2}$ indicate amplitude resolution parameters, v indicates a quantity of layers, $\tilde{\theta}(t_1)$ indicates a phase at the moment t1, $$\Delta\tilde{\varphi}_{l,N_1}^{(v)}$$

indicates a differential phase determined based on the first information, $\tilde{p}(t_1)$ indicates an amplitude at the moment t1, and $$\Delta\tilde{p}_{m,N_{2,1},N_{2,2}}^{(v)}$$

indicates a differential amplitude determined based on the first information.

It should be noted that the terminal device may alternatively determine the first information by feeding back a multiplication result. For example, the first information includes a phase coefficient $\delta_\varphi$ and an amplitude coefficient $\delta_p$. The phase coefficient $\delta_\varphi$ and the phase indication parameter 1 meet the following relationship:

$$\delta_\varphi = 1\cdot N_1, \quad \text{Formula (9)}$$

where $N_1$ indicates a phase resolution parameter, $\delta_\varphi$ indicates the phase coefficient, and l indicates the phase indication parameter.

The amplitude coefficient $\delta_\varphi$ and the phase indication parameter m meet the following relationship:

$$\delta_p = m\cdot N_2, \quad \text{Formula (10)}$$

where $N_2$ indicates an amplitude resolution parameter, $\delta_p$ indicates the amplitude coefficient, and m indicates the amplitude indication parameter.

When the terminal device feeds back the phase coefficient $\delta_\varphi$ and the amplitude coefficient $\delta_p$ to the access network device, the access network device may restore channel elements at the moment t2 based on information at the moment t1:

$$\tilde{h}_{l,m,N_1,N_{2,1},N_{2,2},(n)}^{(v)}(t_2) = e^{j\left(\tilde{\theta}(t_1)\times\delta_\varphi\right)}\left(\tilde{p}(t_1)\delta_p\right).$$

Therefore, when the terminal device does not move, a channel change caused by movement of a satellite is compensated for by the first precoding matrix. It is usually considered that line of sight transmission is performed in a satellite communication scenario, and equivalent channel information may be considered as relatively static or slightly changing. That is, $\Delta\tilde{\varphi}_{j1} \approx 0$, $\Delta\tilde{p}_{j1} \approx 0$. The terminal device may not feed back the first information, or the terminal device feeds back the first information less frequently, thereby reducing overheads of transmission resources. In addition, even if the terminal device feeds back the first information, because the first information is equivalent channel information of the target channel, compared with the conventional technology, in this embodiment of this application, the resolution of the first information can be increased when quantities of bits obtained through quantization are the same.

S405: The terminal device sends the first information to the access network device. Correspondingly, the access network device receives the first information from the terminal device.

For example, the first information includes the parameters (that is, the K groups of $i_{1,1}$, $i_{1,2}$, $i_{2,1}$, $i_{2,2}$, and $i_{2,3}$) of the K first reference signals. For example, values of a group of parameters are as follows: $i_{1,1}=1$, $i_{1,2}=1$, $i_{2,1}=1$, $i_{2,2}=2$, and $i_{2,3}=3$. The first information is carried in a CSI feedback report.

S406: The access network device determines a second precoding matrix based on the first information.

For example, the access network device restores, based on Table 3 and Table 5, equivalent channel information fed back by one terminal device. For another terminal device that receives the first reference signal, S403 to S405 are also performed. After the access network device obtains first information fed back by K terminal devices, the access network device determines a K×K-dimensional equivalent channel matrix. Then the access network device determines a second precoding matrix based on the K×K-dimensional equivalent channel matrix and the formula (2). The K×K-dimensional equivalent channel matrix is specifically as follows:

$$\tilde{H} = \begin{bmatrix} \tilde{h}_{11}, & \tilde{h}_{12}, & \tilde{h}_{13}, & \dots & \tilde{h}_{1K} \\ \tilde{h}_{21}, & \tilde{h}_{22}, & \tilde{h}_{23}, & \dots & \tilde{h}_{2K} \\ & & \dots & & \\ \tilde{h}_{K1}, & \tilde{h}_{K2}, & \tilde{h}_{K3}, & \dots & \tilde{h}_{KK} \end{bmatrix}.$$

For example, at different moments, the access network device determines second precoding matrices at corresponding moments by using first information at the different moments. For example, the access network device determines a second precoding matrix at a $1^{st}$ moment based on first information at the $1^{st}$ moment. The first information at the $1^{st}$ moment includes channel information of the target channel at the $1^{st}$ moment. For another example, the access network device determines a second precoding matrix at an $N^{th}$ moment based on first information at the $N^{th}$ moment. The first information at the $N^{th}$ moment includes differential information of the target channel at the $N^{th}$ moment and an $(N-1)^{th}$ moment. N is a positive integer, and N≥2. Herein, at an $i^{th}$ moment, the target channel is used to transmit a reference signal precoded by using a first precoding matrix corresponding to the $i^{th}$ moment. i is a positive integer, and 1≤i≤N. For descriptions of the "first precoding matrix", refer to related descriptions of S401. Details are not described herein again.

S407: The access network device determines a target precoding matrix based on the first precoding matrix and the second precoding matrix.

For example, the target precoding matrix, the first precoding matrix, and the second precoding matrix meet the following relationship:

$$W = W_1 \cdot W_2, \quad \text{Formula (11)}$$

where W indicates the target precoding matrix, $W_1$ indicates the first precoding matrix, and $W_2$ indicates the second precoding matrix.

For example, at different moments, the access network device determines target precoding matrices at corresponding moments by using first precoding matrices and second precoding matrices that correspond to the different moments. For example, the access network device determines a target precoding matrix at an $i^{th}$ moment based on a first precoding matrix at the $i^{th}$ moment and a second precoding matrix at the $i^{th}$ moment. Herein, i is a positive integer, and 1≤i≤N.

S408: The access network device precodes to-be-sent information by using the target precoding matrix, to obtain information precoded by using the target precoding matrix.

The to-be-sent information is information to be sent by the access network device to the terminal device.

For example, at an $i^{th}$ moment, the access network device precodes the to-be-sent information by using a target precoding matrix at the $i^{th}$ moment. Herein, i is a positive integer, and 1≤i≤N.

S409: The access network device sends, to the terminal device, the information precoded by using the target precoding matrix. Correspondingly, the terminal device receives, from the access network device, the information precoded by using the target precoding matrix.

According to the precoding method provided in this embodiment of this application, when the terminal device receives the first reference signal, because the first reference signal is a reference signal precoded by using the first precoding matrix and is transmitted through the target channel, the information about the target channel that is included in the first information is equivalent channel information. Compared with feeding back real channel information of the target channel, the first channel occupies fewer transmission resources, thereby saving transmission resources for feeding back channel information. In addition, for the access network device, the access network device determines the target precoding matrix based on the first precoding matrix and the first information, and the first precoding matrix is a predictable coding matrix. Therefore, when the terminal device feeds back the equivalent channel information of the target channel, overheads of transmission resources used to feed back channel information can be reduced, and information between the terminal device and the access network device is precoded by using the target precoding matrix.

In some embodiments, in the scenario of Manner 1 in S401, in a process in which the terminal device initially accesses the access network device, the terminal device needs to feed back the first information to the access network device at the $1^{st}$ moment. If the terminal device is far away from the target reference point, for example, the target reference point is a center of a beam, and the terminal device is located at an edge of the beam, first information fed back by the terminal device for the first time occupies a large quantity of transmission resources. To further reduce overheads for feeding back the first information by the terminal device for the first time, before S404, the access network device determines the first precoding matrix used for data transmission. For details about a specific process, refer to S4000 to S4003 shown in FIG. 5(*d*).

S4000: The access network device sends a second reference signal to the terminal device. Correspondingly, the terminal device receives the second reference signal from the access network device.

The second reference signal is a reference signal precoded by using a third precoding matrix. Herein, a reference point corresponding to the third precoding matrix is described as a first reference point. Locations of the first reference point and the target reference point are different. For example, K beams are still used as an example, and a quantity of first reference points and a quantity of target reference points are both K. In addition, for a first reference point and a target reference point that correspond to an $i^{th}$ beam, locations of the first reference point and the target reference point are different. Herein, the locations of the first reference point and the target reference point that correspond to the $i^{th}$ beam are determined by the access network device according to a preset rule. For example, a spacing distance between the first reference point and the target reference point is within a preset range. i is a positive integer, and $1 \leq i \leq K$. Herein, a channel between the access network device and the first reference point is described as a "second channel". That is, the third precoding matrix is a basic precoding matrix determined based on the second channel. Herein, for a specific process of obtaining a third reference signal by the access network device, refer to related descriptions of S401 and S402. Details are not described herein again.

S4001: The terminal device determines second information based on the measurement result of the first reference signal and a measurement result of the second reference signal.

For example, when a quantity of beams is K, a measurement result, determined by a $j^{th}$ terminal device, of a first reference signal includes channel attenuation parameters of K first reference signals. For details, refer to related descriptions of S404. Details are not described herein again. The measurement result of the second reference signal includes channel attenuation parameters of K second reference signals. The $j^{th}$ terminal device determines a reference signal with better signal quality based on the channel attenuation parameters of the first reference signals and the channel attenuation parameters of the second reference signals. Herein, when the terminal device determines that the first reference signal has better signal quality, the terminal device determines that the second information indicates the first reference signal. For example, the second information includes an identifier, a number, or a direction of the first reference signal, or a resource parameter corresponding to the first reference signal.

S4002: The terminal device sends the second information to the access network device. Correspondingly, the access network device receives the second information from the terminal device.

For example, the second information is carried in a CSI feedback report.

S4003: The access network device determines, based on the second information, that the first precoding matrix corresponding to the first reference signal is used for data transmission.

For example, the second information includes the identifier, the number, or the direction of the first reference signal, or the resource parameter corresponding to the first reference signal. Therefore, the access network device can learn that a "reference point corresponding to the first reference signal" is closer to the terminal device, and use the first precoding matrix corresponding to the first reference signal for data transmission.

Therefore, when the access network device determines a group of reference points, the access network device can determine different precoding matrices (for example, the first precoding matrix and the third precoding matrix) based on different reference points corresponding to a beam, and then send, to the terminal device, reference signals precoded by using the different precoding matrices (that is, the first reference signal precoded by using the first precoding matrix and the third reference signal precoded by using the third precoding matrix). The terminal device can feed back the second information to the access network device, to indicate a reference signal to the access network device. Therefore, the access network device can learn of a reference point closer to the terminal device, or the access network device learns of a first reference signal on which the terminal device has better detection performance. Therefore, the access network device may determine, based on the second information, a precoding matrix used for data transmission (for example, the first precoding matrix). Herein, because the first precoding matrix is determined based on the first channel between the access network device and the target reference point, the first precoding matrix better matches the target channel, thereby reducing overheads of resources used by the terminal device to feed back the first information for the first time.

Figure 6:
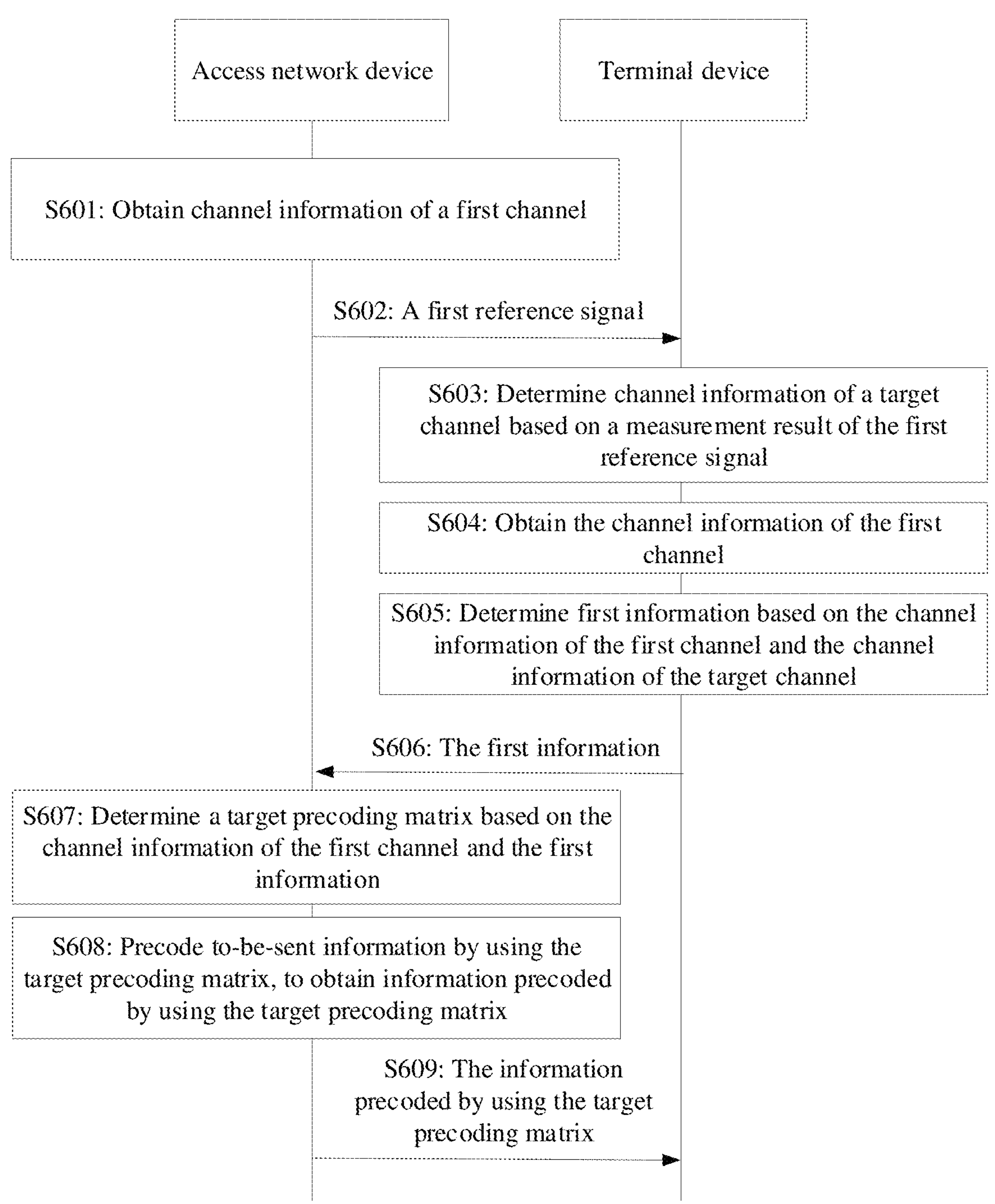
FIG. 6 is a schematic flowchart of still another precoding method according to an embodiment of this application.

An embodiment of this application provides a second precoding method, and the precoding method is applied to a precoding process. As shown in FIG. 6, the precoding method includes the following steps.

S601: An access network device obtains channel information of a first channel.

The channel information of the first channel is predictable information.

For example, the channel information of the first channel is denoted as H0. Herein, the first channel may be a channel between the access network device and a target reference point. For descriptions of the target reference point, refer to related descriptions of S401. Details are not described herein again.

For example, a specific implementation process of S601 may be but is not limited to the following Manner 1 and Manner 2.

Manner 1: The access network device determines the channel information of the first channel based on location information. For details, refer to related descriptions of S4011 and S4012. Details are not described herein again.

Manner 2: At a $1^{st}$ moment (that is, a moment at which no terminal device reports a channel measurement result to the access network device), the first channel is a channel between the access network device and the target reference point. The access network device determines the channel information of the first channel in Manner 1 in S601. The access network device may determine channel information of a target channel at the $1^{st}$ moment by performing S603 to S607. In a communication process after the $1^{st}$ moment, for example, a first channel at an $i^{th}$ moment is a target channel at an $(i-1)^{th}$ moment. Correspondingly, channel information of the first channel at the $i^{th}$ moment is channel information of the target channel at the $(i-1)^{th}$ moment. i is a positive integer, and $2 \leq i$. That is, the access network device uses channel information of a target channel at a previous moment as channel information of a first channel at a current moment. Therefore, for the access network device, the channel information of the first channel is still predictable.

S604: A terminal device obtains the channel information of the first channel.

For descriptions of the "first channel" and the "channel information of the first channel", refer to related descriptions of S601. Details are not described herein again.

Figure 7A:
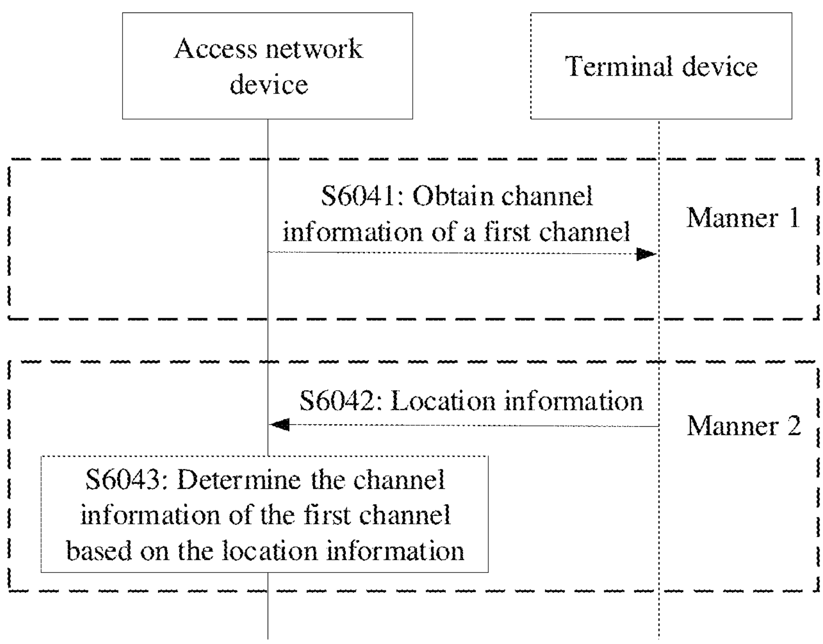
FIG. 7(*a*) is a schematic flowchart of still another precoding method according to an embodiment of this application.
Figure 7B:
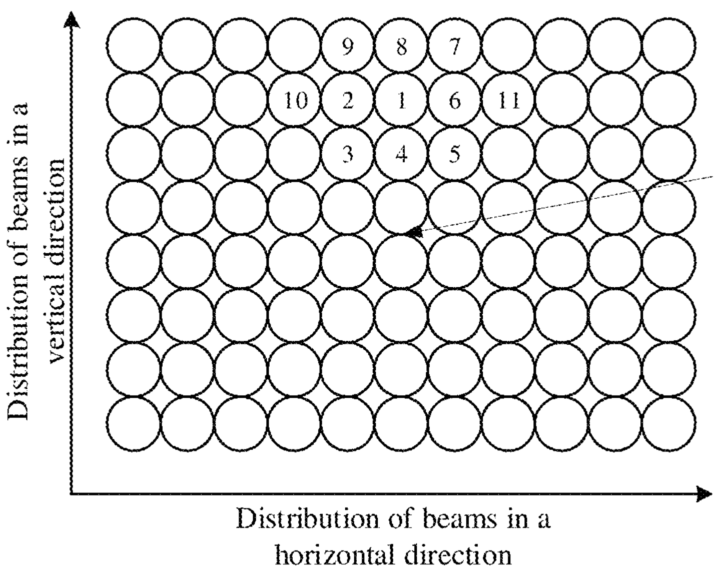
Figure 7C:
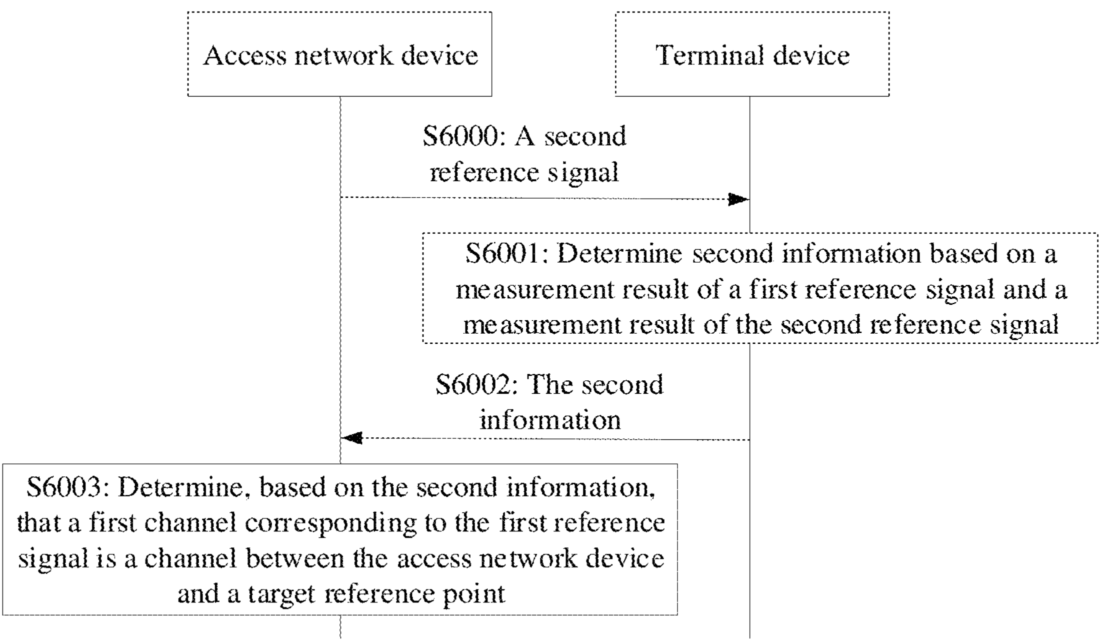

For example, as shown in FIG. 7(*a*), a specific implementation process of S604 may be but is not limited to the following Manner 1 to Manner 3.

Manner 1: S6041: The access network device sends the channel information of the first channel to the terminal device. Correspondingly, the terminal device receives the channel information of the first channel from the access network device.

Manner 2: S6042: The access network device sends the location information to the terminal device. Correspondingly, the terminal device receives the location information from the access network device.

The location information includes at least one of the following:

1. Information about relative locations of the access network device and the target reference point. For example, a center of a beam is used as the target reference point, and the relative locations of the access network device and the target reference point may be represented by using two angles: a horizontal angle and a vertical angle. A target reference point of an $i^{th}$ beam in a first group of beams is used as an example, and location information includes a horizontal angle $\alpha_{1i}$ and a vertical angle $\beta_{1i}$. The horizontal angle $\alpha_{1i}$ indicates a horizontal angle between the access network device and the target reference point of the $i^{th}$ beam in the first group of beams. The vertical angle $\beta_{1i}$ indicates a vertical angle between the access network device and the target reference point of the $i^{th}$ beam in the first group of beams. FIG. 7(*b*) is used as an example. FIG. 7(*b*) is a schematic diagram of beam locations. In FIG. 7(*b*), one circle indicates a coverage area of one beam. A number in the circle indicates a number of the beam. Herein, 11 beams are shown in a horizontal direction, and eight beams are shown in a vertical direction. For example, the access network device is located above a center of coverage areas of the 88 beams, and a location of an arrow indicates a projection of the access network device on the ground. For a beam numbered 8, the terminal device may determine, based on $\alpha_{18}$ and $\beta_{18}$, a location of the beam numbered 8, that is, a location of a circle marked with a number "8" in FIG. 7(*b*). Herein, there may be one or more beams in each group. This is not limited in this embodiment of this application.

In this case, K groups of first reference signals are still used as an example. The access network device sends the location information to the terminal device. The location information includes K groups of parameters. Details are as follows:

$$V = \begin{bmatrix} a_{1i}, a_{2i}, a_{3i}, a_{4i}, \dots a_{Ki} \\ \beta_{1i}, \beta_{2i}, \beta_{3i}, \beta_{4i}, \dots \beta_{Ki} \end{bmatrix} = \begin{bmatrix} 2\pi m_1/N_0, 2\pi m_2/N_0, 2\pi m_3/N_0, \dots , 2\pi m_K/N_0 \\ 2\pi n_1/N_0, 2\pi n_2/N_0, 2\pi n_3/N_0, \dots , 2\pi n_K/N_0 \end{bmatrix},$$

where $m_x$, $n_y$, and $N_0$ indicate resolutions of the location information. Herein, X and Y are both positive integers, 1≤X≤K and 1≤Y≤K. The access network device sends the resolutions of the location information to the terminal device in a broadcast manner. Resolutions of first reference signals in different groups may be the same or different. When there is one first reference signal in each group, the access network device provides "information about relative locations of the access network device and K target reference points" for the terminal device.

2. A geographical location of the target reference point. Herein, after obtaining the geographical location of the target reference point, the terminal device determines a location of the access network device with reference to a motion trajectory of a satellite, to obtain information about relative locations of the access network device and the target reference point.

S6043: The terminal device determines the channel information of the first channel based on the location information.

For a specific implementation process of S6043, refer to related descriptions of S4012. Details are not described herein again.

Therefore, when the access network device provides the location information for the terminal device, the terminal device may determine the channel information of the first channel based on the location information.

Manner 3: At a $1^{st}$ moment (that is, a moment at which the access network device exchanges data with the terminal device for the first time), the first channel is a channel between the access network device and the target reference point. The terminal device determines the channel information of the first channel in Manner 1 in S602 or Manner 2 in S602. The terminal device may determine channel information of a target channel at the $1^{st}$ moment by performing S603 and S604. In a communication process after the $1^{st}$ moment, for example, a first channel at an $i^{th}$ moment is a target channel at an $(i-1)^{th}$ moment. Correspondingly, channel information of the first channel at the $i^{th}$ moment is channel information of the target channel at the $(i-1)^{th}$ moment. i is a positive integer, and 2≤i. That is, the terminal device uses channel information of a target channel at a previous moment as channel information of a first channel at a current moment.

It should be noted that the terminal device may perform S604 before S602, or perform S602 before S604, or simultaneously perform S604 and S602. This is not limited in this embodiment of this application.

S602: The access network device sends a first reference signal to the terminal device. Correspondingly, the terminal device receives the first reference signal from the access network device.

The first reference signal is a non-precoded reference signal. When the first channel is a channel between the access network device and the target reference point, a reference point corresponding to the first reference signal is the target reference point.

For example, there are a plurality of first reference signals. One beam transmits one first reference signal. When a quantity of beams is K, a quantity of first reference signals is also K.

S603: The terminal device determines channel information of a target channel based on a measurement result of the first reference signal.

The target channel is a channel between the terminal device and the access network device. Herein, the first reference signal is a non-precoded reference signal, and the terminal device determines the channel information of the target channel based on the measurement result of the first reference signal. Therefore, the channel information of the target channel that is determined by the terminal device is real information of the target channel.

For example, when a quantity of first reference signals is K, channel information, determined by a $j^{th}$ terminal device, of a target channel is denoted as $H_j=[h_{j1}, h_{j2}, h_{j3}, \dots h_{jK}]$, where $h_{j1}$ indicates a channel attenuation parameter of a $1^{st}$ first reference signal received by the $j^{th}$ terminal device, $h_{j2}$ indicates a channel attenuation parameter of a $2^{nd}$ first reference signal received by the $j^{th}$ terminal device, $h_{j3}$ indicates a channel attenuation parameter of a 3rd first reference signal received by the $j^{th}$ terminal device, and $h_{jK}$ indicates a channel attenuation parameter of a Kth first reference signal received by the $j^{th}$ terminal device. Herein, for the $j^{th}$ terminal device, the K first reference signals include one wanted first reference signal and (K−1) interfering first reference signals.

S605: The terminal device determines first information based on the channel information of the first channel and the channel information of the target channel.

The first information includes information about a difference between the channel information of the first channel and the channel information of the target channel.

For example, the first information includes at least one of amplitude information and phase information. The amplitude information includes differential information of amplitudes of the first channel and the target channel, and the phase information includes differential information of phases of the first channel and the target channel. For example, the $j^{th}$ terminal device is used as an example. Channel information $H_{j(t0)}$, determined by the $j^{th}$ terminal device, of a first channel is as follows:

$$H_{j(t0)} = [h_{j2(t0)}, h_{j2(t0)}, h_{j3(t0)}, \ldots h_{jk(t0)}] = [\varphi_{j1(t0)} p_{j1(t0)}, \varphi_{j2(t0)} p_{j2(t0)}, \varphi_{j3(t0)} p_{j3(t0)}, \ldots \varphi_{jk(t0)} p_{jk(t0)}].$$

Channel information $H_{j(t1)}$, determined by the $j^{th}$ terminal device, of a target channel is as follows:

$$H_{j(t1)} = [h_{j2(t1)}, h_{j2(t1)}, h_{j3(t1)}, \ldots h_{jk(t1)}] = [\varphi_{j1(t1)} p_{j1(t1)}, \varphi_{j2(t1)} p_{j2(t1)}, \varphi_{j3(t1)} p_{j3(t1)}, \ldots \varphi_{jk(t1)} p_{jk(t1)}].$$

First, the $j^{th}$ terminal device determines a differential phase and a differential amplitude based on the channel information $H_{j(t0)}$ of the first channel and the channel information $H_{j(t1)}$ of the target channel. A $1^{st}$ first reference signal received by the $j^{th}$ terminal device is used as an example, and a differential phase and a differential amplitude meet the following relationship:

$$\begin{cases} \Delta\varphi_{j1} = \varphi_{j1(t1)} - \varphi_{j1(t0)} \\ \Delta p_{j1} = p_{j1(t1)} - p_{j1(t0)} \end{cases}. \quad \text{Formula (12)}$$

Herein, it is easily understood that, for a $2^{nd}$ first reference signal to a Kth first reference signal that are received, the $j^{th}$ terminal device also performs differential processing according to the foregoing process, to obtain differential phases and differential amplitudes of K first reference signals.

Then the $j^{th}$ terminal device quantizes the differential phases and the differential amplitudes of the K first reference signals. For a specific implementation process of the "quantization", refer to related descriptions of S4044. Details are not described herein again. Herein, for descriptions of a resolution of the first information and a determining process, refer to related descriptions of S4041 to S4044. Details are not described herein again. Certainly, the terminal device may alternatively determine the first information by feeding back a multiplication result. To be specific, the first information includes a phase coefficient $\delta_\varphi$ and an amplitude coefficient $\delta_p$. Refer to related descriptions of the formula (9) and the formula (10). Details are not described herein again.

S606: The terminal device sends the first information to the access network device. Correspondingly, the access network device receives the first information from the terminal device.

For example, the first information includes parameters (that is, K groups of $i_{1,1}$, $i_{1,2}$, $i_{2,1}$, $i_{2,2}$, and $i_{2,3}$) of K first reference signals, and the first information is carried in a CSI feedback report.

S607: The access network device determines a target precoding matrix based on the channel information of the first channel and the first information.

For example, when the first information is a channel matrix indication (channel matrix indication, CMI), channel information of a first channel at a $1^{st}$ moment is denoted as $H_0$, and the target precoding matrix, the channel information of the first channel, and the first information meet the following relationship:

$$W_t = \mathcal{F}(H_1) = \mathcal{F}(\mathcal{G}(H_0, CMI_1)), \quad \text{Formula (13)}$$

where $W_t$ indicates the target precoding matrix, F( ) indicates to calculate a precoding matrix, G( ) indicates a channel estimation operation, $H_0$ indicates the channel information of the first channel at the $1^{st}$ moment, and $CMI_1$ indicates a channel matrix indication corresponding to the $1^{st}$ moment. Herein, $H_1$ indicates channel information of a target channel at the $1^{st}$ moment, and meets the following formula (14) or formula (15):

$$H_1 = \mathcal{G}(H_0, CMI_1) = h^{(v,j,k)}_{l,m,N_1,N_{2,1},N_{2,2},(n)}(1) = e^{j\left(\theta(t_0)+\Delta\varphi^{(v,j,k)}_{l,N_1}\right)}\left(p(t_0) + \Delta p^{(v,j,k)}_{m,N_{2,1},N_{2,2}}\right), \quad \text{Formula (14)}$$

where $$h^{(v,j,k)}_{l,m,N_1,N_{2,2},(N)} \quad (1)$$

indicates the channel information of the target channel at the $1^{st}$ moment, l indicates a phase indication parameter, m indicates an amplitude indication parameter, k indicates a kth first reference signal, $N_1$ indicates a phase resolution parameter, $N_{2,1}$ and $N_{2,2}$ indicate amplitude resolution parameters, v indicates a quantity of layers, $\theta(t_0)$ indicates a phase of $$t_0, \Delta\varphi^{(v,j,k)}_{1,N_1}$$

indicates a differential phase determined based on the first information, and $$\Delta p^{(v,j,k)}_{m,N_{2,1},N_{2,2}}$$

indicates a differential amplitude determined based on the first information.

Formula (15)

$$H_1 = \mathcal{G}(H_0, CMI_1) = h^{(v,j,k)}_{l,m,N_1,N_{2,1},N_{2,2},(n)}(1) = e^{j(\theta(t_0)\cdot\delta_\varphi)}(p(t_0)\cdot\delta_p),$$

where $$h^{(v,j,k)}_{l,m,N_1,N_{2,1},N_{2,2},(n)} \quad (1)$$

indicates channel elements of the target channel at the 1st moment, l indicates a phase indication parameter, m indicates an amplitude indication parameter, $N_1$ indicates a phase resolution parameter, $N_{2,1}$ and $N_{2,2}$ indicate amplitude resolution parameters, v indicates a quantity of layers, $\theta(t_0)$ indicates a phase of $t_0$, $\delta_\varphi$ indicates a phase coefficient determined based on the first information, and $\delta_p$ indicates an amplitude coefficient determined based on the first information.

When an $(N-1)^{th}$ moment is denoted as a moment $t-\Delta t$ and an $N^{th}$ moment is denoted as a moment t, channel information of a first channel at the $(N-1)^{th}$ moment is denoted as $H_{t-\Delta t}$, and the target precoding matrix, the channel information of the first channel, and the first information meet the following relationship:

$$W_t = \mathcal{F}(H_t) = \mathcal{F}(\mathcal{G}(H_{t-\Delta t}, CMI_n)), \quad \text{Formula (16)}$$

where $W_t$ indicates the target precoding matrix, F( ) indicates to calculate a precoding matrix, G( ) indicates a channel estimation operation, $H_{t-\Delta t}$ indicates channel information of a first channel at the $(N-1)^{th}$ moment, and $CMI_n$ indicates a channel matrix indication corresponding to the $N^{th}$ moment. Herein, $H_t$ indicates channel information of a target channel at the $N^{th}$ moment, and meets the following formula (17) or formula (18):

Formula (17)

$$H_t = \mathcal{G}(H_{t-\Delta t}, CMI_n) = h^{(v,j,k)}_{l,m,N_1,N_{2,1},N_{2,2},(n)}(t) = e^{j\left(\theta(t-\Delta t)+\Delta\varphi^{(v,j,k)}_{l,N_1}\right)}\left(p(t-\Delta t) + \Delta p^{(v,j,k)}_{m,N_{2,1},N_{2,2}}\right),$$

where $$h^{(v,j,k)}_{l,m,N_1,N_{2,1},N_{2,2},(n)}(t)$$

indicates channel elements of a target channel corresponding to the $N^{th}$ moment, l indicates a phase indication parameter, m indicates an amplitude indication parameter, k indicates an kth first reference signal, $N_1$ indicates a phase resolution parameter, $N_{2,1}$ and $N_{2,2}$ indicate amplitude resolution parameters, v indicates a quantity of layers, $\theta(t-\Delta t)$ indicates a phase at a moment $$t-\Delta t, \Delta\varphi^{(v,j,k)}_{l,N_1}$$

indicates a differential phase determined based on the first information, and $$\Delta p^{(v,j,k)}_{m,N_{2,1},N_{2,2}}$$

indicates a differential amplitude determined based on the first information.

Formula (18)

$$H_t = \mathcal{G}(H_{t-\Delta t}, CMI_n) = h^{(v,j,k)}_{l,m,N_1,N_{2,1},N_{2,2},(n)}(t) = e^{j(\theta(t-\Delta t)\cdot\delta_\varphi)}(p(t-\Delta t)\cdot\delta_p),$$

where $h^{(v,j,k)}_{l,m,N_1,N_{2,1},N_{2,2},(n)}(t)$ indicates channel elements of a target channel corresponding to the $N^{th}$ moment, l indicates a phase indication parameter, m indicates an amplitude indication parameter, k indicates an kth first reference signal, $N_1$ indicates a phase resolution parameter, $N_{2,1}$ and $N_{2,2}$ indicate amplitude resolution parameters, v indicates a quantity of layers, $\theta_{(t-\Delta t)}$ indicates a phase at a moment $t-\Delta t$, $\cdot\delta_\varphi$ indicates a phase coefficient determined based on the first information, and $\delta_p$ indicates an amplitude coefficient determined based on the first information.

S608: The access network device precodes to-be-sent information by using the target precoding matrix, to obtain information precoded by using the target precoding matrix.

The to-be-sent information is information to be sent by the access network device to the terminal device.

For example, at an $i^{th}$ moment, the access network device precodes the to-be-sent information by using a target precoding matrix at the $i^{th}$ moment. Herein, i is a positive integer, and $1 \le i \le N$.

S609: The access network device sends, to the terminal device, the information precoded by using the target precoding matrix. Correspondingly, the terminal device receives, from the access network device, the information precoded by using the target precoding matrix.

According to the precoding method provided in this embodiment of this application, when the terminal device obtains the channel information of the first channel, the terminal device can determine the first information based on the channel information of the target channel and the channel information of the first channel, to feed back the first information to the access network device. Therefore, the first information includes information about a difference between the channel information of the target channel and the channel information of the first channel. Compared with feeding back real channel information of the target channel, the first channel occupies fewer transmission resources, thereby saving transmission resources for feeding back channel information. In addition, for the access network device, the access network device determines the target precoding matrix based on the first precoding matrix and the first information, and the first precoding matrix is a predictable coding matrix. Therefore, when the terminal device feeds back the first information, overheads of transmission resources used to feed back channel information can be reduced, and information between the terminal device and the access network device is precoded by using the target precoding matrix.

In some embodiments, in the scenario of Manner 1 in S601, in a process in which the terminal device initially accesses the access network device, the terminal device needs to feed back the first information to the access network device at the 1st moment. If the terminal device is far away from the target reference point, for example, the target reference point is a center of a beam, and the terminal device is located at an edge of the beam, first information fed back by the terminal device for the first time occupies a large quantity of transmission resources. To further reduce overheads for feeding back the first information by the terminal device for the first time, before S605, the access network device determines the first channel. For a specific process, refer to S6000 to S6003 shown in FIG. 7(*c*).

S6000: The access network device sends a second reference signal to the terminal device. Correspondingly, the terminal device receives the second reference signal from the access network device.

The second reference signal is a non-precoded reference signal. Reference points corresponding to the second reference signal and the first reference signal are different. A reference point corresponding to the second reference signal is a first reference point. A reference point corresponding to the first reference signal is the target reference point. Herein, locations of the first reference point and the target reference point are different. For example, K beams are still used as an example, and a quantity of first reference points and a quantity of target reference points are both K. In addition, for a first reference point and a target reference point that correspond to an $i^{th}$ beam, locations of the first reference point and the target reference point are different. Herein, the locations of the first reference point and the target reference point that correspond to the $i^{th}$ beam are determined by the access network device according to a preset rule. For example, a spacing distance between the first reference point and the target reference point is within a preset range. i is a positive integer, and $1 \le i \le K$.

S6001: The terminal device determines second information based on the measurement result of the first reference signal and a measurement result of the second reference signal.

For example, when a quantity of beams is K, a measurement result, determined by a $j^{th}$ terminal device, of a first reference signal includes channel attenuation parameters of K first reference signals. The measurement result of the second reference signal includes channel attenuation parameters of K second reference signals. The $j^{th}$ terminal device determines a reference signal with better signal quality based on the channel attenuation parameters of the first reference signals and the channel attenuation parameters of the second reference signals. Herein, when the terminal device determines that the first reference signal has better signal quality, the terminal device determines that the second information indicates the first reference signal. For example, the second information includes an identifier, a number, or a direction of the first reference signal, or a resource parameter corresponding to the first reference signal.

S6002: The terminal device sends the second information to the access network device. Correspondingly, the access network device receives the second information from the terminal device.

For example, the second information is carried in a CSI feedback report.

S6003: The access network device determines, based on the second information, that the first channel corresponding to the first reference signal is a channel between the access network device and the target reference point.

For example, the second information includes the identifier, the number, or the direction of the first reference signal, or the resource parameter corresponding to the first reference signal. Therefore, the access network device can learn that the "reference point corresponding to the first reference signal" is closer to the terminal device. In this case, the access network device determines that the first channel is a channel between the access network device and the target reference point.

Therefore, when the access network device determines a group of reference points, the access network device can send different reference signals (that is, the first reference signal and the second reference signal) to the terminal device. The terminal device can feed back the second information to the access network device, to indicate a reference signal to the access network device. Therefore, the access network device can learn of a reference point closer to the terminal device, or the access network device can learn of a reference signal on which the terminal device has the best detection performance. The access network device may determine, based on the second information, that the first channel is a channel between the access network device and the target reference point. Therefore, a difference between the first channel and the target channel is smaller, and the first information includes information about the difference between the first channel and the target channel, thereby reducing overheads of resources used to feed back the first information.

The foregoing mainly describes solutions provided in embodiments of this application from a perspective of interaction between network elements. Correspondingly, embodiments of this application further provide a communication apparatus. The communication apparatus may be the network element in the method embodiments, or an apparatus including the foregoing network element, or a component that can be used in the network element. It may be understood that, to implement the foregoing functions, the communication apparatus includes a corresponding hardware structure and/or software module for performing the functions. A person skilled in the art should be easily aware that units and algorithm steps in examples described with reference to embodiments disclosed in this specification can be implemented in a form of hardware or a combination of hardware and computer software in this application. Whether a function is performed by hardware or hardware driven by computer software depends on particular applications and design constraints of technical solutions. A person skilled in the art may use different methods to implement the described functions for each particular application, but it should not be considered that the implementation goes beyond the scope of this application.

Figure 8:
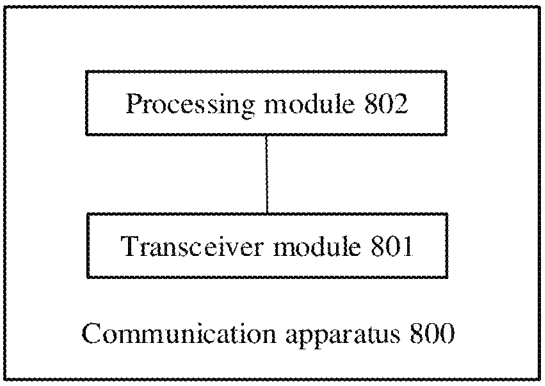
FIG. 8 is a schematic diagram of a structure of a communication apparatus according to an embodiment of this application.

FIG. 8 is a schematic diagram of a structure of a communication apparatus 800. The communication apparatus 800 includes a transceiver module 801 and a processing module 802.

For example, the communication apparatus 800 is the terminal device in FIG. 4 in the method embodiments. The transceiver module 801 is configured to receive a first reference signal from an access network device, where the first reference signal is a reference signal precoded by using a first precoding matrix. The transceiver module 801 is further configured to send first information to the access network device, where the first information includes information about a target channel between the terminal device and the access network device, the first information is determined by the processing module 802, the target channel is used to transmit the first reference signal, and the first information is used by the access network device to determine a target precoding matrix. The transceiver module 801 is further configured to receive, from the access network device, information precoded by using the target precoding matrix.

In a possible design, a resolution corresponding to the first information is preconfigured. Alternatively, the processing module 802 is configured to determine a resolution corresponding to the first information, and the transceiver module 801 is further configured to send, to the access network device, the resolution corresponding to the first information. Alternatively, the transceiver module 801 is further configured to receive indication information from the access network device, where the indication information indicates a resolution corresponding to the first information.

In a possible design, the transceiver module 801 is further configured to receive a second reference signal from the access network device, where the second reference signal is a reference signal precoded by using a third precoding matrix. The processing module 802 is configured to determine second information based on a measurement result of the first reference signal and a measurement result of the second reference signal, where the second information indicates the first reference signal. The transceiver module 801 is further configured to send the second information to the access network device, where the second information is used by the access network device to determine that the first precoding matrix is used for data transmission.

For example, the communication apparatus 800 is the terminal device in FIG. 6 in the method embodiments. The processing module 802 is configured to obtain channel information of a first channel. The processing module 802 is further configured to determine first information based on the channel information of the first channel and channel information of a target channel, where the target channel is a channel between the terminal device and an access network device. The transceiver module 801 is configured to send the first information to the access network device, where the first information is used by the access network device to determine a target precoding matrix. The transceiver module 801 is further configured to receive, from the access network device, information precoded by using the target precoding matrix.

In a possible design, the transceiver module 801 is configured to receive the channel information of the first channel from the access network device, and the processing module 802 is configured to obtain the channel information of the first channel from the transceiver module 801. Alternatively, the transceiver module 801 is configured to receive location information from the access network device, where the location information includes at least one of the following: information about relative locations of the access network device and a target reference point, or a geographical location of the target reference point. The processing module 802 is configured to determine the channel information of the first channel based on the location information.

In a possible design, a resolution corresponding to the first information is preconfigured. Alternatively, the processing module 802 is configured to determine a resolution corresponding to the first information, and the transceiver module 801 is configured to send, to the access network device, the resolution corresponding to the first information. Alternatively, the transceiver module 801 is configured to receive indication information from the access network device, where the indication information indicates a resolution corresponding to the first information.

In a possible design, the transceiver module 801 is configured to receive a first reference signal and a second reference signal from the access network device, where reference points corresponding to the first reference signal and the second reference signal are different. The processing module 802 is configured to determine second information based on a measurement result of the first reference signal and a measurement result of the second reference signal, where the second information indicates the first reference signal, the second information is used by the access network device to determine that the first channel is a channel between the access network device and the target reference point, and the first reference signal corresponds to the target reference point.

For example, the communication apparatus 800 is the access network device in FIG. 2 in the method embodiments. The transceiver module 801 is configured to send a first reference signal to a terminal device, where the first reference signal is a reference signal precoded by using a first precoding matrix. The transceiver module 801 is further configured to receive first information from the terminal device, where the first information includes information about a target channel between the access network device and the terminal device, and the target channel is used to transmit the first reference signal. The processing module 802 is configured to determine a second precoding matrix based on the first information. The processing module 802 is further configured to determine a target precoding matrix based on the first precoding matrix and the second precoding matrix. The processing module 802 is further configured to precode to-be-sent information by using the target precoding matrix.

In a possible design, the processing module 802 is further configured to obtain location information, where the location information includes at least one of the following: information about relative locations of the access network device and a target reference point, or a geographical location of the target reference point, and the terminal device is located in an area range corresponding to the target reference point. The processing module 802 is further configured to determine channel information of a first channel based on the location information, where the first channel is a channel between the access network device and the target reference point. The processing module 802 is further configured to determine the first precoding matrix based on the channel information of the first channel.

In a possible design, a resolution corresponding to the first information is preconfigured. Alternatively, the transceiver module 801 is further configured to receive, from the terminal device, a resolution corresponding to the first information. Alternatively, the processing module 802 is further configured to determine a resolution corresponding to the first information, and the transceiver module 801 is further configured to send indication information to the terminal device, where the indication information indicates the resolution corresponding to the first information.

In a possible design, the processing module 802 is specifically configured to determine a second precoding matrix at an $N^{th}$ moment based on first information at the $N^{th}$ moment, where the first information at the $N^{th}$ moment includes differential information of the target channel at the $N^{th}$ moment and an $(N-1)^{th}$ moment, at an $i^{th}$ moment, the target channel is used to transmit a reference signal precoded by using a first precoding matrix corresponding to the $i^{th}$ moment, i and N are positive integers, $1 \le i \le N$, and $N \ge 2$. The processing module 802 is specifically configured to determine a target precoding matrix at the $N^{th}$ moment based on a first precoding matrix at the $N^{th}$ moment and the second precoding matrix at the $N^{th}$ moment. The processing module 802 is specifically configured to precode the to-be-sent information by using the target precoding matrix at the $N^{th}$ moment.

In a possible design, the transceiver module 801 is further configured to send a second reference signal to the terminal device, where the second reference signal is a reference signal precoded by using a third precoding matrix. The transceiver module 801 is further configured to receive second information from the terminal device, where the second information indicates the first reference signal. The processing module 802 is further configured to determine, based on the second information, that the first precoding matrix corresponding to the first reference signal is used for data transmission.

For example, the communication apparatus 800 is the access network device in FIG. 6 in the method embodiments. The processing module 802 is configured to obtain channel information of a first channel. The transceiver module 801 is configured to receive first information from a terminal device, where the first information includes information about a difference between the channel information of the first channel and channel information of a target channel, and the target channel is a channel between the access network device and the terminal device. The processing module 802 is further configured to determine a target precoding matrix based on the channel information of the first channel and the first information. The processing module 802 is further configured to precode to-be-sent information by using the target precoding matrix.

In a possible design, the processing module 802 is further configured to obtain location information, where the location information includes at least one of the following: information about relative locations of the access network device and a target reference point, or a geographical location of the target reference point. The processing module 802 is further configured to determine the channel information of the first channel based on the location information.

In a possible design, a resolution corresponding to the first information is preconfigured. Alternatively, the transceiver module 801 is further configured to receive, from the terminal device, a resolution corresponding to the first information. Alternatively, the processing module 802 is further configured to determine a resolution corresponding to the first information, and the transceiver module 801 is further configured to send indication information to the terminal device, where the indication information indicates the resolution corresponding to the first information.

In a possible design, the transceiver module 801 is further configured to send a first reference signal and a second reference signal to the terminal device, where reference points corresponding to the first reference signal and the second reference signal are different. The transceiver module 801 is further configured to receive second information from the terminal device, where the second information indicates the first reference signal. The processing module 802 is further configured to determine, based on the second information, that the first channel corresponding to the first reference signal is a channel between the access network device and the target reference point, where the first reference signal corresponds to the target reference point.

All related content of the steps included in the method embodiments may be cited in function descriptions of corresponding functional modules. Details are not described herein again.

It should be understood that the processing module 802 in this embodiment of this application may be implemented by a processor or a processor-related circuit component, and the transceiver module 801 may be implemented by a transceiver or a transceiver-related circuit component.

In a possible implementation, an embodiment of this application provides a chip. The chip includes a logic circuit and an input/output interface. The input/output interface is configured to communicate with a module outside the chip, and the logic circuit is configured to perform operations other than sending and receiving operations on the terminal device in the method embodiments.

For example, the chip is implemented as a function of the terminal device in FIG. 4 in the method embodiments. The input/output interface performs S4000, S4002, S403, S4042, S4044, S405, and S409 on the terminal device side, and/or the input/output interface is further configured to perform other sending and receiving steps on the terminal device side in embodiments of this application. The logic circuit is configured to perform S4001, S404, and S4043 on the terminal device side, and/or the logic circuit is further configured to perform other processing steps on the terminal device side in embodiments of this application.

For another example, the chip is implemented as a function of the terminal device in FIG. 6 in the method embodiments. The input/output interface performs S6000, S6002, S602, S6041, S6042, S606, and S609 on the terminal device side, and/or the input/output interface is further configured to perform other sending and receiving steps on the terminal device side in embodiments of this application. The logic circuit is configured to perform S6001, S603, S604, and S605 on the terminal device side, and/or the logic circuit is further configured to perform other processing steps on the terminal device side in embodiments of this application.

For example, the chip is implemented as a function of the access network device in FIG. 4 in the method embodiments. The input/output interface performs S4000, S4002, S403, S4042, S4044, S405, and S409 on the access network device side, and/or the input/output interface is further configured to perform other sending and receiving steps on the access network device side in embodiments of this application. The logic circuit is configured to perform S4003, S401, S4011, S4012, S4013, S402, S4041, S406, S407, and S408 on the access network device side, and/or the logic circuit is further configured to perform other processing steps on the access network device side in embodiments of this application.

Figure 9:
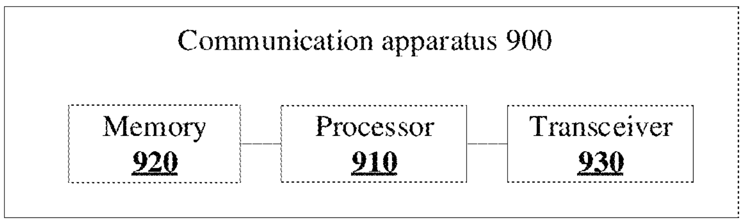
FIG. 9 is a schematic diagram of a hardware structure of a communication apparatus according to an embodiment of this application.

For another example, the chip is implemented as a function of the access network device in FIG. 6 in the method embodiments. The input/output interface performs S6000, S6002, S602, S6041, S6042, S606, and S609 on the access network device side, and/or the input/output interface is further configured to perform other sending and receiving steps on the access network device side in embodiments of this application. The logic circuit is configured to perform S6003, S601, S6043, S607, and S608 on the access network device side, and/or the logic circuit is further configured to perform other processing steps on the access network device side in embodiments of this application. As shown in FIG. 9, an embodiment of this application further provides a communication apparatus 900. The communication apparatus 900 includes a processor 910, a memory 920, and a transceiver 930. The memory 920 stores instructions or a program, and the processor 910 is configured to execute the instructions or the program stored in the memory 920. When the instructions or the program stored in the memory 920 is executed, the processor 910 is configured to perform an operation performed by the processing module 802 in the foregoing embodiment, and the transceiver 930 is configured to perform an operation performed by the transceiver module 801 in the foregoing embodiment.

Figure 5C:
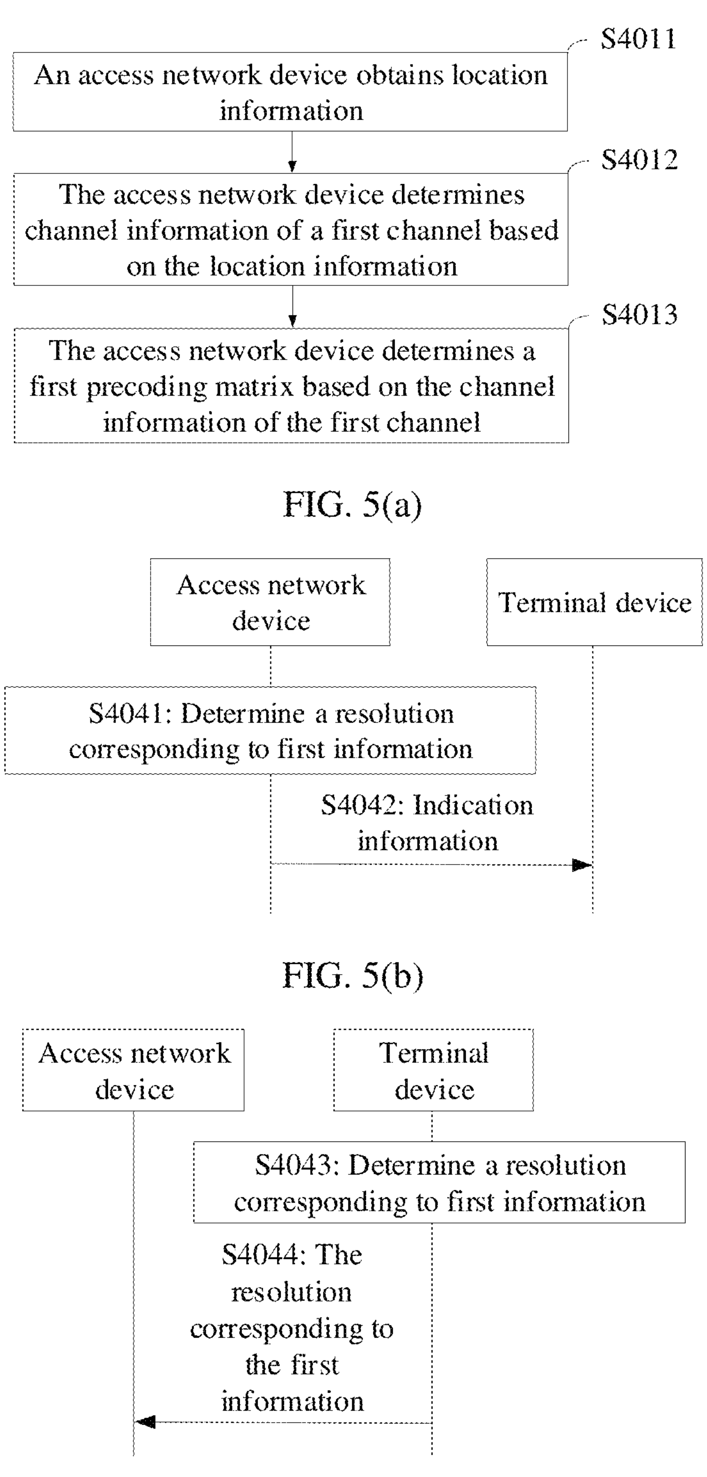
FIG. 5(*a*) is a schematic flowchart of another precoding method according to an embodiment of this application.
Figure 5D:
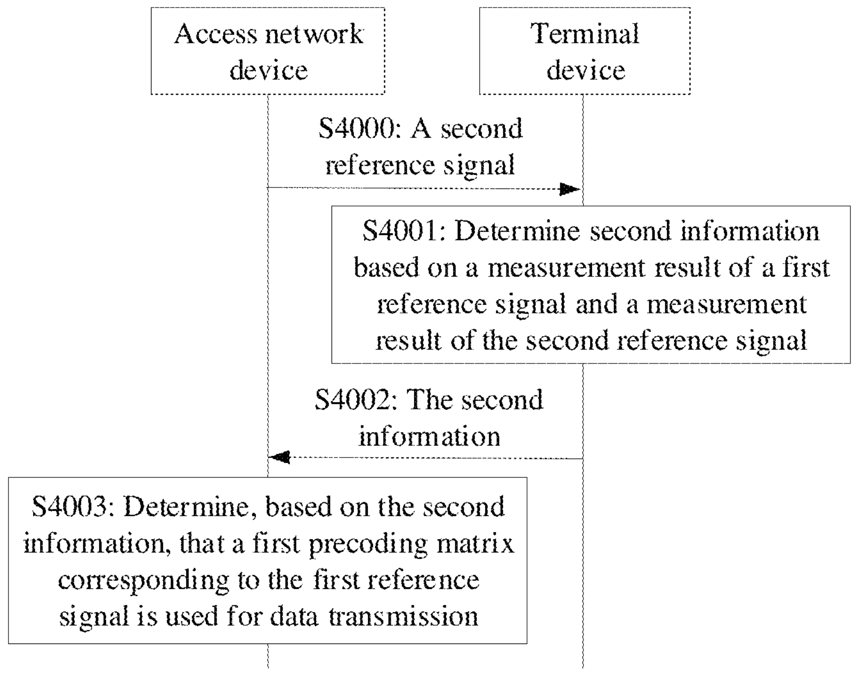

It should be understood that the communication apparatus 800 or the communication apparatus 900 in embodiments of this application may correspond to the terminal device in the precoding method in FIG. 4, FIG. 5(*b*), FIG. 5(*c*), FIG. 5(*d*), FIG. 6, FIG. 7(*a*), or FIG. 7(*c*) in embodiments of this application, and operations and/or functions of modules in the communication apparatus 800 or the communication apparatus 900 are respectively used to implement corresponding processes of the methods in the figures. Alternatively, the communication apparatus 800 or the communication apparatus 900 in embodiments of this application may correspond to the access network device in the precoding method in FIG. 4, FIG. 5(*a*), FIG. 5(*b*), FIG. 5(*c*), FIG. 5(*d*), FIG. 6, FIG. 7(*a*), or FIG. 7(*c*) in embodiments of this application, and operations and/or functions of modules in the communication apparatus 800 or the communication apparatus 900 are respectively used to implement corresponding processes of the methods in the figures. For brevity, details are not described herein again.

Figure 10:
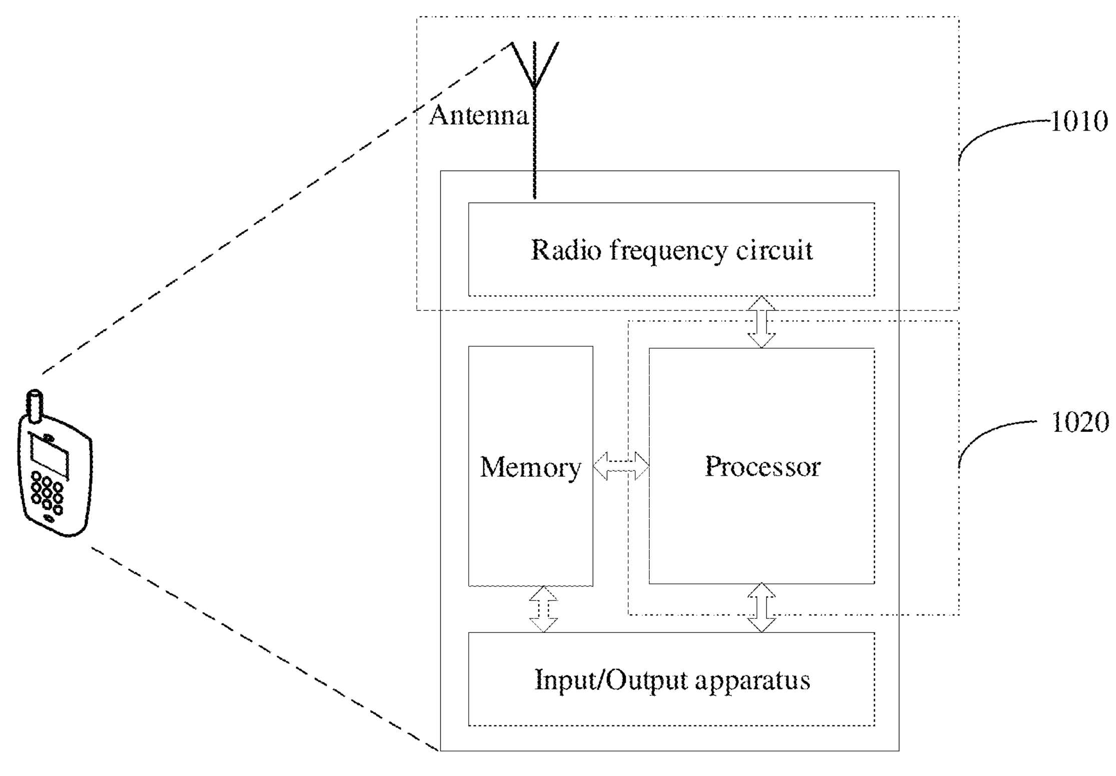
FIG. 10 is a schematic diagram of a structure of another communication apparatus according to an embodiment of this application.

When the communication apparatus is a terminal device, FIG. 10 is a simplified schematic diagram of a structure of a terminal device. For ease of understanding and convenience of figure illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to perform conversion between a baseband signal and a radio frequency signal and process the radio frequency signal. The antenna is mainly configured to send and receive radio frequency signals in a form of an electromagnetic wave. The input/output apparatus, for example, a touchscreen, a display, or a keyboard, is mainly configured to receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data. For ease of description, only one memory and one processor are shown in FIG. 10. An actual terminal device product may include one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit that have a transceiver function may be considered as a transceiver unit of the terminal device, and the processor that has a processing function may be considered as a processing unit of the terminal device. As shown in FIG. 10, the terminal device includes a transceiver unit 1010 and a processing unit 1020. The transceiver unit 1010 may also be referred to as a transceiver, a transceiver machine, a transceiver apparatus, or the like. The processing unit 1020 may also be referred to as a processor, a processing board, a processing module, a processing apparatus, or the like. Optionally, a component that is in the transceiver unit 1010 and that is configured to implement a receiving function may be considered as a receiving unit, and a component that is in the transceiver unit 1010 and that is configured to implement a sending function may be considered as a sending unit. That is, the transceiver unit 1010 includes the receiving unit and the sending unit. The transceiver unit 1010 sometimes may also be referred to as a transceiver machine, a transceiver, a transceiver circuit, or the like. The receiving unit sometimes may also be referred to as a receiving machine, a receiver, a receive circuit, or the like. The sending unit sometimes may also be referred to as a transmitting machine, a transmitter, a transmit circuit, or the like.

It should be understood that the transceiver unit 1010 is configured to perform a sending operation and a receiving operation on the terminal device side in the method embodiments, and the processing unit 1020 is configured to perform operations other than the sending and receiving operations on the terminal device in the method embodiments.

For example, in an implementation, the transceiver unit 1010 is configured to perform S403, S405, and S409 in FIG. 4, and/or the transceiver unit 1010 is further configured to perform other sending and receiving steps on the terminal device side in embodiments of this application. The processing unit 1020 is configured to perform S404 in FIG. 4, and/or the processing unit 1020 is further configured to perform other processing steps on the terminal device side in embodiments of this application.

For another example, in another implementation, the transceiver unit 1010 is configured to perform S4042 in FIG. 5(*b*), and/or the transceiver unit 1010 is further configured to perform other sending and receiving steps on the terminal device side in embodiments of this application. The processing unit 1020 is further configured to perform other processing steps on the terminal device side in embodiments of this application.

For still another example, in another implementation, the transceiver unit 1010 is configured to perform S4044 in FIG. 5(*c*), and/or the transceiver unit 1010 is further configured to perform other sending and receiving steps on the terminal device side in embodiments of this application. The processing unit 1020 is configured to perform S4043 in FIG. 5(*c*), and/or the processing unit 1020 is further configured to perform other processing steps on the terminal device side in embodiments of this application.

For still another example, in another implementation, the transceiver unit 1010 is configured to perform S4000 and S4002 in FIG. 5(*d*), and/or the transceiver unit 1010 is further configured to perform other sending and receiving steps on the terminal device side in embodiments of this application. The processing unit 1020 is configured to perform S4001 in FIG. 5(*d*), and/or the processing unit 1020 is further configured to perform other processing steps on the terminal device side in embodiments of this application.

For still another example, in another implementation, the transceiver unit 1010 is configured to perform S602, S606, and S609 in FIG. 6, and/or the transceiver unit 1010 is further configured to perform other sending and receiving steps on the terminal device side in embodiments of this application. The processing unit 1020 is configured to perform S603, S604, and S605 in FIG. 6, and/or the processing unit 1020 is further configured to perform other processing steps on the terminal device side in embodiments of this application.

For still another example, in another implementation, the transceiver unit 1010 is configured to perform S6041 and S6042 in FIG. 7(*a*), and/or the transceiver unit 1010 is further configured to perform other sending and receiving steps on the terminal device side in embodiments of this application. The processing unit 1020 is further configured to perform other processing steps on the terminal device side in embodiments of this application.

For still another example, in another implementation, the transceiver unit 1010 is configured to perform S6000 and S6002 in FIG. 7(*c*), and/or the transceiver unit 1010 is further configured to perform other sending and receiving steps on the terminal device side in embodiments of this application. The processing unit 1020 is configured to perform S6001 in FIG. 7(*c*), and/or the processing unit 1020 is further configured to perform other processing steps on the terminal device side in embodiments of this application.

Figure 11:
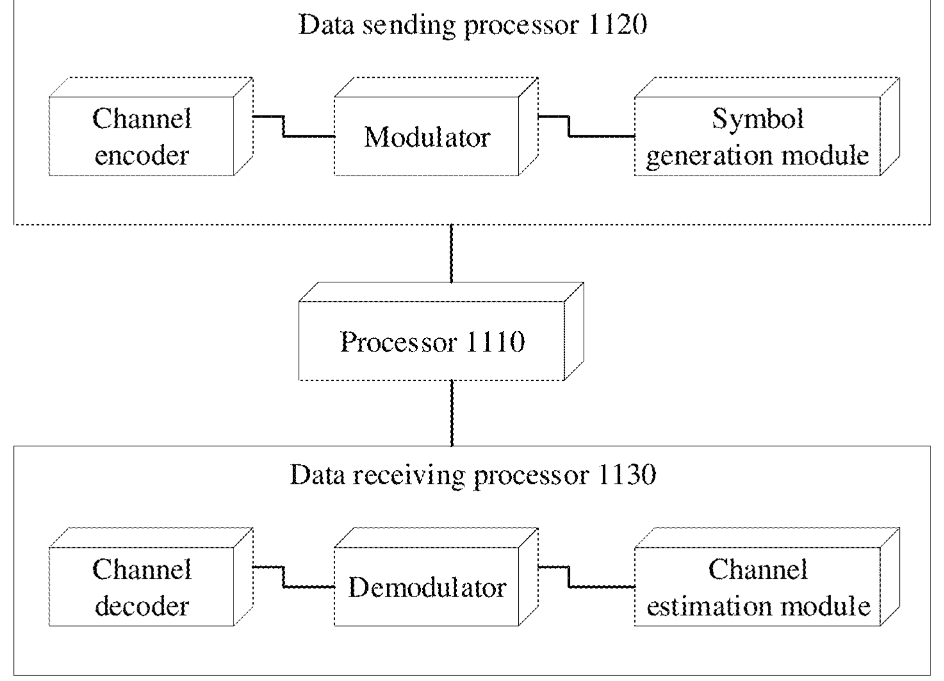
FIG. 11 is a schematic diagram of a structure of still another communication apparatus according to an embodiment of this application.

When the communication apparatus in embodiments of this application is a terminal device, refer to a device shown in FIG. 11. In an example, the device may implement a function similar to that of the processor 910 in FIG. 9. In FIG. 11, the device includes a processor 1110, a data sending processor 1120, and a data receiving processor 1130. The processing module 802 in the foregoing embodiment may be the processor 1110 in FIG. 11, and implements a corresponding function. The transceiver module 801 in the foregoing embodiment may be the data sending processor 1120 and/or the data receiving processor 1130 in FIG. 11. Although FIG. 11 shows a channel encoder, a channel decoder, a symbol generation module, and a channel estimation module, it may be understood that these modules are merely examples, and do not constitute a limitative description of this embodiment of this application.

Figure 12:
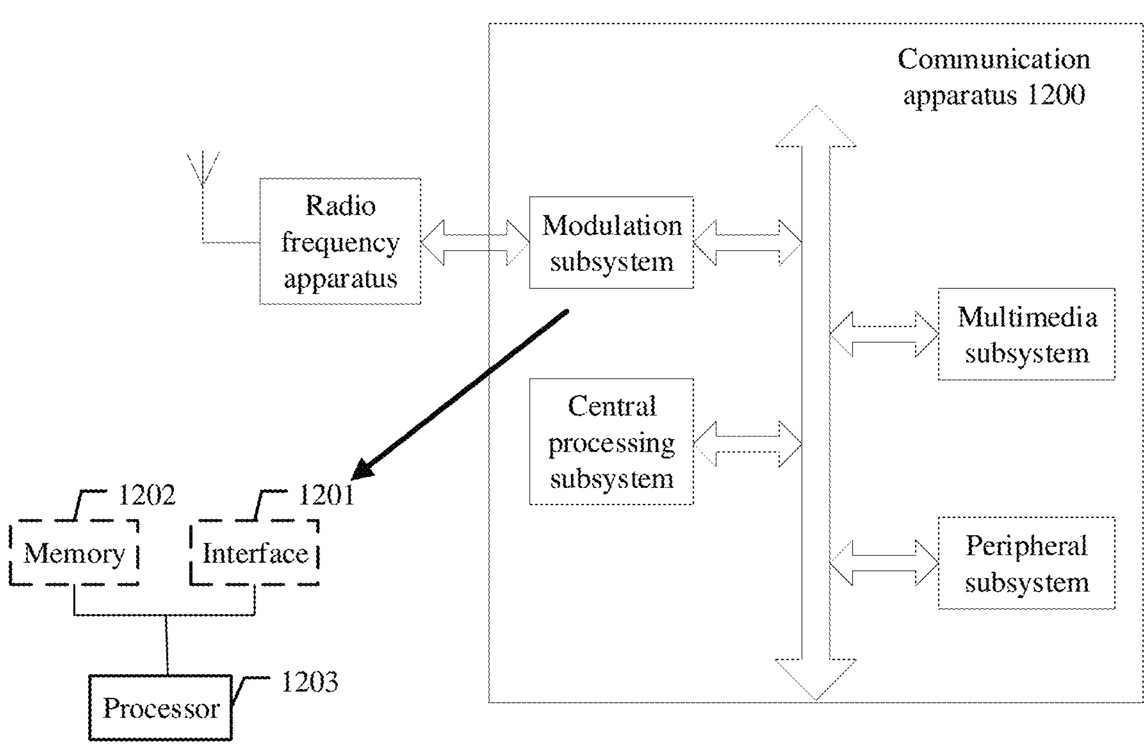
FIG. 12 is a schematic diagram of a structure of still another communication apparatus according to an embodiment of this application.

FIG. 12 shows another form according to an embodiment of this application. A communication apparatus 1200 includes modules such as a modulation subsystem, a central processing subsystem, a peripheral subsystem, and a multimedia subsystem. The communication apparatus in embodiments of this application may serve as the modulation subsystem. Specifically, the modulation subsystem may include a processor 1203 and an interface 1201. The processor 1203 performs a function of the processing module 802, and the interface 1201 performs a function of the transceiver module 801. In another variant, the modulation subsystem includes a memory 1202, a processor 1203, and a program that is stored in the memory 1202 and that can be run on the processor. When executing the program, the processor 1203 implements the method on the terminal device side in the method embodiments. It should be noted that the memory 1202 may be non-volatile or volatile. The memory 1202 may be located in the modulation subsystem or the processing apparatus 1200, provided that the memory 1202 can be connected to the processor 1203.

In another form of embodiments of this application, an embodiment of this application provides a computer-readable storage medium. The computer-readable storage medium stores instructions. When the instructions are executed, the method on the terminal device side in the method embodiments is performed.

In another form of embodiments of this application, an embodiment of this application provides a computer program product including instructions. When the instructions are executed, the method on the terminal device side in the method embodiments is performed.

Figure 13:
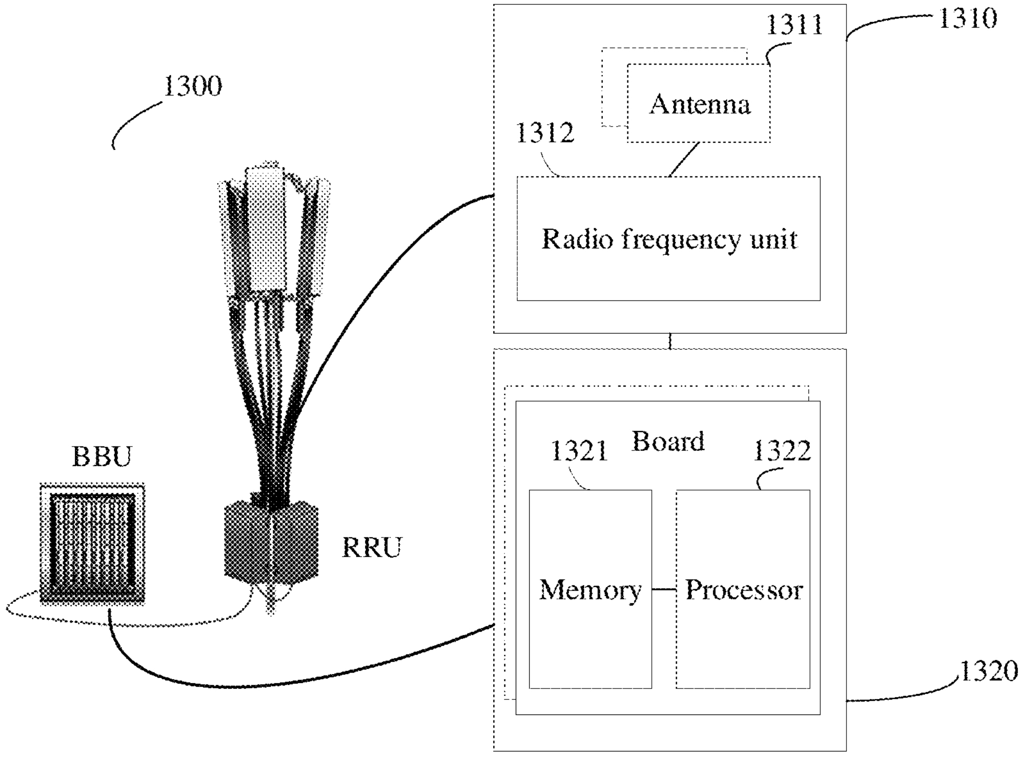
FIG. 13 is a schematic diagram of a structure of still another communication apparatus according to an embodiment of this application.

When the communication apparatus in embodiments of this application is an access network device, the access network device may be shown in FIG. 13. A communication apparatus 1300 includes one or more radio frequency units, for example, a remote radio unit (RRU) 1310, and one or more baseband units (BBU) (which may also be referred to as a digital unit (DU)) 1320. The RRU 1310 may be referred to as a transceiver module, and corresponds to the transceiver module 801 in FIG. 8. Optionally, the transceiver module may also be referred to as a transceiver machine, a transceiver circuit, a transceiver, or the like, and may include at least one antenna 1311 and a radio frequency unit 1312. The RRU 1310 part is mainly configured to send or receive a radio frequency signal and perform conversion between a radio frequency signal and a baseband signal, for example, configured to send, to a terminal device, a first reference signal, a second reference signal, and information precoded by using a target precoding matrix. The BBU 1320 part is mainly configured to perform baseband processing, control a base station, and the like. The RRU 1310 and the BBU 1320 may be physically disposed together, or may be physically separated, that is, a distributed base station.

The BBU 1320 is a control center of the base station, may also be referred to as a processing module, may correspond to the processing module 802 in FIG. 8, and is mainly configured to perform baseband processing functions such as channel coding, multiplexing, modulation, and spectrum spreading. For example, the BBU (processing module) may be configured to control the base station to perform an operation process related to the access network device in the method embodiments, for example, generate the first reference signal, the second reference signal, and the information precoded by using the target precoding matrix.

In an example, the BBU 1320 may include one or more boards. A plurality of boards may jointly support a radio access network of a single access standard (for example, an LTE network), or may separately support radio access networks of different access standards (for example, an LTE network, a 5G network, or another network). The BBU 1320 further includes a memory 1321 and a processor 1322. The memory 1321 is configured to store necessary instructions and data. The processor 1322 is configured to control the base station to perform a necessary action, for example, configured to control the base station to perform an operation process related to the access network device in the method embodiments. The memory 1321 and the processor 1322 may serve the one or more boards. That is, a memory and a processor may be disposed on each board. Alternatively, a plurality of boards may share a same memory and a same processor. In addition, a necessary circuit may be further disposed on each board.

In another form of embodiments of this application, an embodiment of this application provides a computer-readable storage medium. The computer-readable storage medium stores instructions. When the instructions are executed, the method on the access network device side in the method embodiments is performed.

In another form of embodiments of this application, an embodiment of this application provides a computer program product including instructions. When the instructions are executed, the method on the access network device side in the method embodiments is performed.

It should be understood that the processor mentioned in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and serves as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that, when the processor is a general-purpose processor, a DSP, an ASIC, an FPGA or another programmable logic device, a discrete gate or transistor logic device, or a discrete hardware component, the memory (storage module) is integrated in the processor.

It should be noted that the memory described in this specification is intended to include but not limited to these memories and any memory of another appropriate type.

It should be understood that the term “and/or” in this specification describes only an association relationship between associated objects and represents that three relationships may exist. For example, A and/or B may represent the following three cases: Only A exists, both A and B exist, and only B exists. In addition, the character “/” in this specification generally indicates an “or” relationship between the associated objects.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraints of technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the method embodiments. Details are not described herein again.

In several embodiments provided in this application, it should be understood that the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected according to actual requirements to achieve objectives of solutions of embodiments of this application.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application essentially, or the part contributing to the conventional technology, or some of technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:

receiving, by a terminal device from an access network device, a first reference signal that is precoded using a first precoding matrix;

sending, by the terminal device to the access network device, first information, wherein the first information is determined by the terminal device based on a measurement result of the first reference signal, and the first information determines a target precoding matrix; and receiving, by the terminal device from the access network device, information precoded using the target precoding matrix;

wherein the first precoding matrix at a $1^{st}$ moment is a basic precoding matrix determined based on a first channel, the first channel is a channel between the access network device and a target reference point, and the terminal device is located in an area range corresponding to the target reference point; and the first precoding matrix at an $i^{th}$ moment is a target precoding matrix at an $(i-1)^{th}$ moment, wherein i is an integer, and $i \geq 2$.

2. The method according to claim 1, wherein the first information comprises amplitude information of a target channel or phase information of the target channel or amplitude information and phase information of the target channel, the target channel being a channel between the terminal device and the access network device.

3. The method according to claim 1, wherein a resolution corresponding to the first information is preconfigured.

4. The method according to claim 1, wherein content of the first information at the $1^{st}$ moment comprises channel information of a target channel at the $1^{st}$ moment; and content of the first information at an $N^{th}$ moment comprises differential information of the target channel at an $(N-1)^{th}$ moment and the $N^{th}$ moment, wherein at the $i^{th}$ moment, the target channel is used to transmit the first reference signal corresponding to the $i^{th}$ moment, N is a positive integer, $1 \leq i \leq N$, and $N \geq 2$.

5. The method according to claim 4, wherein the method further comprises:

receiving, by the terminal device from the access network device, a second reference signal preceded using a third precoding matrix;

determining, by the terminal device, second information based on the measurement result of the first reference signal and a measurement result of the second reference signal, wherein the second information indicates the first reference signal; and sending, by the terminal device to the access network device, the second information indicating that the first precoding matrix is used for data transmission.

6. The method according to claim 1, further comprising:

determining, by the terminal device, a resolution corresponding to the first information; and sending, by the terminal device to the access network device, the resolution corresponding to the first information.

7. The method according to claim 1, further comprising:

obtaining, by the terminal device, indication information from the access network device, wherein the indication information indicates a resolution corresponding to the first information.

8. A method comprising:

sending, by an access network device to a terminal device, a first reference signal that is precoded using a first precoding matrix;

obtaining, by the access network device from the terminal device, first information, wherein the first information is based on a measurement result of the first reference signal;

determining, by the access network device, a second precoding matrix based on the first information;

determining, by the access network device, a target precoding matrix based on the first precoding matrix and the second precoding matrix; and precoding, by the access network device, to-be-sent information using the target precoding matrix;

wherein the first precoding matrix at a $1^{st}$ moment is a basic precoding matrix determined based on a first channel, the first channel is a channel between the access network device and a target reference point, and the terminal device is located in an area range corresponding to the target reference point; and wherein the first precoding matrix at an $i^{th}$ moment is a target precoding matrix at an $(i-1)^{th}$ moment, wherein i is an integer, and $i \geq 2$.

9. The method according to claim 8, wherein the method further comprises:

obtaining, by the access network device, location information, wherein the location information comprises at least one of following: information about relative locations of the access network device and a target reference point, or a geographical location of the target reference point, and wherein the terminal device is located in an area range corresponding to the target reference point;

determining, by the access network device, channel information of a first channel based on the location information, wherein the first channel is a channel between the access network device and the target reference point; and determining, by the access network device, the first precoding matrix based on the channel information of the first channel.

10. The method according to claim 8, wherein the first information comprises amplitude information of a target channel or phase information of the target channel or amplitude information and phase information of the target channel, and the target channel is a channel between the access network device and the terminal device.

11. The method according to claim 8, wherein a resolution corresponding to the first information is preconfigured.

12. The method according to claim 8, wherein, determining, by the access network device, the second precoding matrix based on the first information comprises:

determining, by the access network device, the second precoding matrix at an $N^{th}$ moment based on content of the first information at the $N^{th}$ moment, the content comprising differential information of a target channel at the $N^{th}$ moment and an $(N-1)^{th}$ moment, wherein at the $i^{th}$ moment, the target channel is used to transmit the first reference signal corresponding to the $i^{th}$ moment, N is an integer, $1 \leq i \leq N$, $N \geq 2$, and the target channel is a channel between the access network device and the terminal device;

determining, by the access network device, the target precoding matrix based on the first precoding matrix and the second precoding matrix comprises:

determining, by the access network device, the target precoding matrix at the $N^{th}$ moment based on the first precoding matrix at the $N^{th}$ moment and the second precoding matrix at the $N^{th}$ moment; and precoding, by the access network device, the to-be-sent information using the target precoding matrix comprises:

precoding, by the access network device, the to-be-sent information using the target precoding matrix at the $N^{th}$ moment.

13. The method according to claim 12, wherein the method further comprises:

sending, by the access network device, a second reference signal that is precoded using a third precoding matrix;

obtaining, by the access network device, second information, wherein the second information is based on the measurement result of the first reference signal and a measurement result of the second reference signal, and indicates the first reference signal; and determining, by the access network device based on the second information, that the first precoding matrix corresponding to the first reference signal is used for data transmission.

14. The method according to claim 8, further comprising:

obtaining, by the access network device from the terminal device, a resolution corresponding to the first information.

15. The method according to claim 8, further comprising:

determining, by the access network device, a resolution corresponding to the first information; and sending, by the access network device, indication information to the terminal device, wherein the indication information indicates the resolution corresponding to the first information.

16. An apparatus, comprising:

at least one processor; and memory storing instructions that are executable by the at least one processor, wherein executing the instructions causes the apparatus to:

receive, from an access network device, a first reference signal that is precoded using a first precoding matrix;

send, to the access network device, first information, wherein the first information is determined by the apparatus based on a measurement result of the first reference signal, and the first information determines a target precoding matrix; and receive, from the access network device, information precoded using the target precoding matrix;

wherein the first precoding matrix at a $1^{st}$ moment is a basic precoding matrix determined based on a first channel, the first channel is a channel between the access network device and a target reference point, and the apparatus is located in an area range corresponding to the target reference point; and the first precoding matrix at an $i^{th}$ moment is a target precoding matrix at an $(i-1)^{th}$ moment, wherein i is an integer, and $i \geq 2$.

17. The apparatus according to claim 16, wherein the first information comprises amplitude information of a target channel or phase information of the target channel or amplitude information and phase information of the target channel, the target channel being a channel between the apparatus and the access network device.

18. The apparatus according to claim 16, wherein a resolution corresponding to the first information is preconfigured.

19. The apparatus according to claim 16, wherein:

content of the first information at the $1^{st}$ moment comprises channel information of a target channel at the $1^{st}$ moment; and content of the first information at an $N^{th}$ moment comprises differential information of the target channel at an $(N-1)^{th}$ moment and the $N^{th}$ moment, wherein at the $i^{th}$ moment, the target channel is used to transmit the first reference signal corresponding to the $i^{th}$ moment, N is a positive integer, $1 \leq i \leq N$, and $N \geq 2$.

20. The apparatus according to claim 19, wherein executing the instructions causes the apparatus to:

receive, from the access network device, a second reference signal precoded using a third precoding matrix;

determine second information based on the measurement result of the first reference signal and a measurement result of the second reference signal, wherein the second information indicates the first reference signal; and send, to the access network device, the second information indicating that the first precoding matrix is used for data transmission.

* * * * *